(12) United States Patent
Nakagawa et al.

(10) Patent No.: US 12,148,453 B2
(45) Date of Patent: Nov. 19, 2024

(54) MAGNETIC HEAD WITH CONDUCTIVE NON-MAGNETIC LAYER CONTACT CONFIGURATIONS

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki (JP); Masayuki Takagishi, Kunitachi (JP); Naoyuki Narita, Funabashi (JP); Tazumi Nagasawa, Yokohama (JP); Tomoyuki Maeda, Kawasaki (JP)

(73) Assignees: KABUSHIKI KAISHA TOSHIBA, Tokyo (JP); TOSHIBA ELECTRONIC DEVICES & STORAGE CORPORATION (JP)

( * ) Notice: Subject to any disclaimer, the term of this patent is extended or adjusted under 35 U.S.C. 154(b) by 0 days.

(21) Appl. No.: 17/586,024

(22) Filed: Jan. 27, 2022

(65) Prior Publication Data
US 2023/0062839 A1 Mar. 2, 2023

(30) Foreign Application Priority Data
Aug. 25, 2021 (JP) .................................. 2021-136906

(51) Int. Cl.
  *G11B 5/31* (2006.01)
  *G11B 5/127* (2006.01)
  *G11B 5/235* (2006.01)
(52) U.S. Cl.
  CPC ............ *G11B 5/315* (2013.01); *G11B 5/1278* (2013.01); *G11B 5/235* (2013.01)

(58) Field of Classification Search
None
See application file for complete search history.

(56) References Cited

U.S. PATENT DOCUMENTS

| 7,616,412 B2 | 11/2009 | Zhu et al. |
| 7,688,544 B1* | 3/2010 | Mallary et al. .. G08B 13/19634 360/125.07 |
| 10,762,919 B1* | 9/2020 | Song et al. .......... G11B 5/1278 |
| 10,777,219 B1* | 9/2020 | Asif Bashir et al. ........ G11B 5/1278 |
| 10,839,844 B1* | 11/2020 | Asif Bashir et al. ........ G11B 5/1278 |
| 11,557,314 B1* | 1/2023 | Asif Bashir et al. .. G11B 5/235 |
| 2008/0268291 A1 | 10/2008 | Akiyama et al. |
| 2009/0147410 A1* | 6/2009 | Jiang et al. .......... G11B 5/1278 360/319 |

(Continued)

FOREIGN PATENT DOCUMENTS

| JP | 2008-277586 A | 11/2008 |
| JP | 2010-073286 A | 4/2010 |

(Continued)

*Primary Examiner* — Craig A. Renner
(74) *Attorney, Agent, or Firm* — Oblon, McClelland, Maier & Neustadt, L.L.P.

(57) ABSTRACT

According to one embodiment, a magnetic head includes a magnetic pole, a shield, and a non-magnetic layer. The non-magnetic layer is provided between the magnetic pole and the shield. The non-magnetic layer is in contact with the magnetic pole and the shield. The non-magnetic layer includes a first element including at least one selected from the group consisting of Cu, Au, Cr, V, Al and Ag.

9 Claims, 12 Drawing Sheets

(56) References Cited

U.S. PATENT DOCUMENTS

| | | |
|---|---|---|
| 2010/0073804 A1 | 3/2010 | Ikeda et al. |
| 2010/0208379 A1 | 8/2010 | Ikeda et al. |
| 2012/0092787 A1* | 4/2012 | Koizumi .............. G11B 5/1278 360/123.01 |
| 2015/0015992 A1* | 1/2015 | Funayama ........... G11B 5/1278 360/119.04 |
| 2015/0092292 A1* | 4/2015 | Furukawa et al. ..... G11B 5/314 360/59 |
| 2015/0109699 A1* | 4/2015 | Boone et al. ........ G11B 5/3146 360/125.32 |
| 2017/0092304 A1 | 3/2017 | Koizumi et al. |
| 2018/0075868 A1* | 3/2018 | Koui et al. ........... G11B 5/1278 |
| 2018/0204589 A1* | 7/2018 | Suto et al. ........... G11B 5/1278 |
| 2019/0267029 A1* | 8/2019 | Bai et al. ................ G11B 5/235 |
| 2020/0005815 A1* | 1/2020 | Bai et al. ................ G11B 5/235 |
| 2020/0090685 A1* | 3/2020 | Takagishi et al. ..... G11B 5/235 |
| 2020/0381012 A1* | 12/2020 | Chembrolu et al. . G11B 5/1278 |
| 2024/0112694 A1* | 4/2024 | Asif Bashir et al. ........................ G11B 5/1278 |

FOREIGN PATENT DOCUMENTS

| | | |
|---|---|---|
| JP | 2010-097628 A | 4/2010 |
| JP | 2010-108991 A | 5/2010 |
| JP | 2010-182347 A | 8/2010 |
| JP | 2010-186522 A | 8/2010 |
| JP | 2017-068883 A | 4/2017 |

\* cited by examiner

MAGNETIC HEAD WITH CONDUCTIVE NON-MAGNETIC LAYER CONTACT CONFIGURATIONS

CROSS-REFERENCE TO RELATED APPLICATIONS

This application is based upon and claims the benefit of priority from Japanese Patent Application No. 2021-136906, filed on Aug. 25, 2021; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve a recording density in the magnetic head and the magnetic recording device.

DETAILED DESCRIPTION

Figure 1:
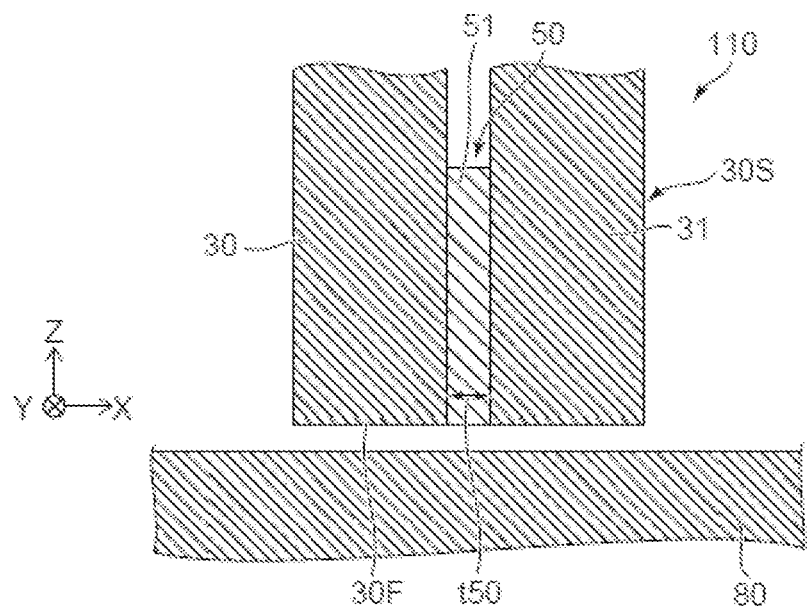
FIG. 1 is a schematic cross-sectional view illustrating a magnetic head according to a first embodiment.

According to one embodiment, a magnetic head includes a magnetic pole, a shield, and a non-magnetic layer. The non-magnetic layer is provided between the magnetic pole and the shield. The non-magnetic layer is in contact with the magnetic pole and the shield. The non-magnetic layer includes a first element including at least one of the group consisting of Cu, Au, Cr, V, Al and Ag.

According to one embodiment, a magnetic head includes a magnetic pole, and a non-magnetic layer. The magnetic pole includes a first partial region and a second partial region. The non-magnetic layer is provided between the first partial region and the second partial region. The non-magnetic layer includes at least one first element selected from the group consisting of Cu, Au, Cr, V, Al and Ag.

According to one embodiment, a magnetic recording device includes the magnetic head according to any one described above, and a first current circuit. The first current circuit is configured to supply a first current between the magnetic pole and the shield. When the first current is supplied between the magnetic pole and the shield, an alternating magnetic field is generated from at least one of the magnetic pole or the shield.

According to one embodiment, a magnetic head includes a magnetic pole, and a conductive member electrically connected to the magnetic pole. When an AC current is supplied to the conductive member and the magnetic pole, an alternating magnetic field is generated from the magnetic pole.

According to one embodiment, a magnetic head includes a magnetic pole, a shield, and a stacked body provided between the magnetic pole and the shield. The stacked body includes a first magnetic layer, a first non-magnetic layer, and a second non-magnetic layer. The first non-magnetic layer is provided between the magnetic pole and the first magnetic layer. The first magnetic layer includes one of a first material and a second material. The first material includes at least one selected from the group consisting of Cu, Au, Cr, V, Al and Ag. The second material includes at least one selected from the group consisting of Ru, Ir, Ta, Rh, Pd, Pt, and W. The second non-magnetic layer is provided between the first magnetic layer and the shield. The second magnetic layer includes other one of the first material and the second material. At least one of the magnetic pole or the shield oscillates with the stacked body.

According to one embodiment, a magnetic head includes a magnetic pole, a first shield which is one of a trailing shield and a leading shield, a first side shield, and a stacked body. A direction from the magnetic pole toward the first side shield crosses a direction from the magnetic pole toward the first shield. The stacked body is provided between the first shield and the first side shield. The stacked body includes a first magnetic layer, a first non-magnetic layer, and a second non-magnetic layer. The first non-magnetic layer is provided between the first magnetic layer and the first shield. The first non-magnetic layer includes one of a first material and a second material. The first material includes at least one selected from the group consisting of Cu, Au, Cr, V, Al and Ag. The second material includes at least one selected from the group consisting of Ru, Ir, Ta, Rh, Pd, Pt, and W. The second non-magnetic layer is provided between the first magnetic layer and the first side shield. The second non-magnetic layer includes other one of the first material and the second material. At least one of the first shield or the first side shield oscillates with the stacked body.

According to one embodiment, a magnetic head includes a magnetic pole including a first partial region and a second partial region, and a stacked body provided between the first partial region and the second partial region. The stacked body includes a first magnetic layer, a first non-magnetic layer, and a second non-magnetic layer. The first non-magnetic layer is provided between the first partial region and the first magnetic layer. The first non-magnetic layer includes one of a first material and a second material. The first material includes at least one selected from the group consisting of Cu, Au, Cr, V, Al and Ag. The second material includes at least one selected from the group consisting of Ru, Ir, Ta, Rh, Pd, Pt, and W. The second non-magnetic layer is provided between the first magnetic layer and the second partial region. The second non-magnetic layer includes other one of the first material and the second material. At least a part of the magnetic pole oscillates with the stacked body.

First Embodiment

FIG. 1 is a schematic cross-sectional view illustrating a magnetic head according to a first embodiment.

Figure 2:
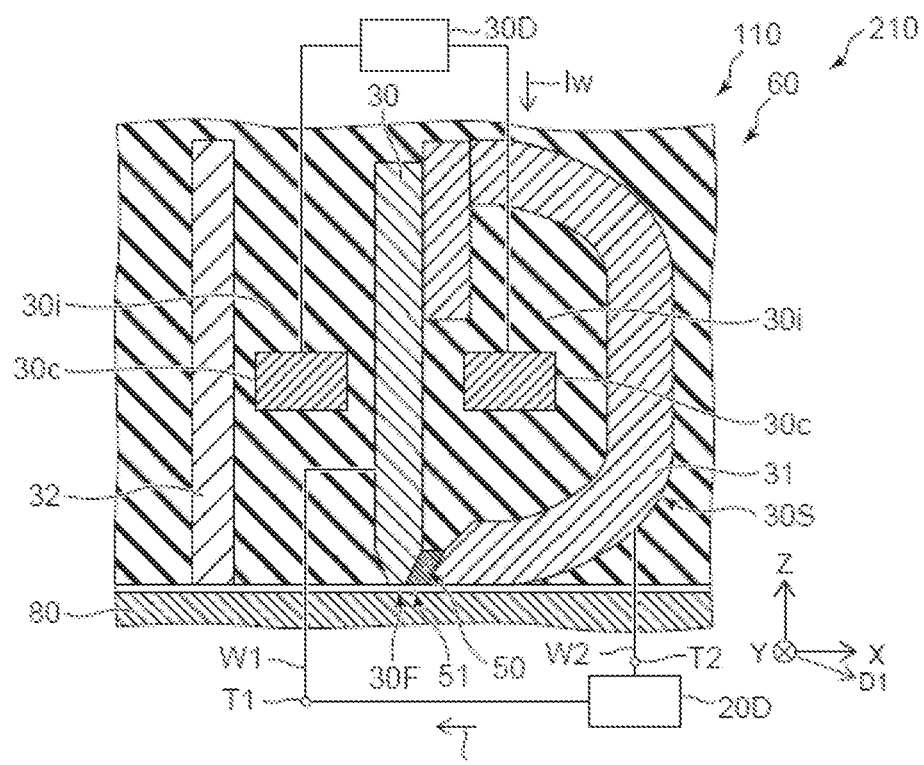
FIG. 2 is a schematic cross-sectional view illustrating a magnetic recording device according to the first embodiment.

FIG. 2 is a schematic cross-sectional view illustrating a magnetic recording device according to the first embodiment.

As shown in FIG. 2, a magnetic recording device 210 according to the first embodiment includes a magnetic head 110, and a first current circuit 20D. The magnetic recording device 210 may include a magnetic recording medium 80. In the magnetic recording device 210, at least a recording operation is performed. In the recording operation, information is recorded on the magnetic recording medium 80 using the magnetic head 110.

The magnetic head 110 includes a recording part 60. As described later, the magnetic head 110 may include a reproducing part. The recording part 60 includes a magnetic pole 30, a shield 30S, and a non-magnetic layer 50.

As shown in FIG. 1, the non-magnetic layer 50 is located between the magnetic pole 30 and the shield 30S. The non-magnetic layer 50 contacts the magnetic pole 30 and the shield 30S. The non-magnetic layer 50 includes at least one first element selected from the group consisting of Cu, Au, Cr, V, Al, and Ag. In this example, a first non-magnetic layer 51 is provided as the non-magnetic layer 50.

The shield 30S includes a first shield 31. The shield 30S (first shield 31) is one of a trailing shield and a leading shield.

For example, the magnetic pole 30 and the first shield 31 form a magnetic circuit. The magnetic pole 30 is, for example, a major magnetic pole. The first shield 31 is, for example, the trailing shield.

As shown in FIG. 2, a direction from the magnetic recording medium 80 toward the magnetic head 110 is taken as a Z-axis direction. One direction perpendicular to the Z-axis direction is taken as an X-axis direction. A direction perpendicular to the Z-axis direction and the X-axis direction is taken as a Y-axis direction. The Z-axis direction corresponds to, for example, a height direction. The X-axis direction corresponds to, for example, a down track direction. The Y-axis direction corresponds to, for example, a cross track direction. The magnetic recording medium 80 and the magnetic head 110 move relatively along the down track direction. A magnetic field (recording magnetic field) generated from the magnetic head 110 is applied to a desired position of the magnetic recording medium 80. Magnetization at the desired position of the magnetic recording medium 80 is controlled to the direction corresponding to the recording magnetic field. As a result, information is recorded on the magnetic recording medium 80.

A direction from the magnetic pole 30 toward the first shield 31 is taken as a first direction D1 (see FIG. 2). The first direction is substantially along the X-axis direction. In the embodiment, the first direction D1 may be tilted to the X-axis direction with a small angle.

As shown in FIG. 2, a coil 30c is provided. In this example, a part of the coil 30c is between the magnetic pole 30 and the first shield 31. In this example, a second shield 32 is provided. In the X-axis direction, the magnetic pole 30 is between the second shield 32 and the first shield 31. Another part of the coil 30c is between the second shield 32 and the magnetic pole 30. An insulating portion 30i is provided between those multiple elements. The second shied 32 is, for example, the leading shield. The magnetic head 110 may include a side shield described later.

As shown in FIG. 2, a recording current Iw is supplied to the coil 30c from a recording circuit 30D. The recording magnetic field corresponding to the recording current Iw is applied to the magnetic recording medium 80 from the magnetic pole 30.

As shown in FIG. 2, the magnetic pole 30 includes a medium-facing surface 30F. The medium-facing surface 30F is, for example, ABS (Air Bearing Surface). The medium-facing surface 30F faces, for example, the magnetic recording medium 80. The medium-facing surface 30F is, for example, along an X-Y plane.

As shown in FIG. 2, the first current circuit 20D is electrically connected to the magnetic pole 30 and the first shield 31. For example, the magnetic head 110 is provided with a first terminal T1 and a second terminal T2. The first terminal T1 is electrically connected to the non-magnetic layer 50 via a first wiring W1 and the magnetic pole 30. The second terminal T2 is electrically connected to the non-magnetic layer 50 via a second wiring W2 and the first shield 31. From the first current circuit 20D, for example, a first current I1 (for example, a DC current) is supplied to a stacked portion of the magnetic pole 30, the non-magnetic layer 50, and the first shield 31. The first current I1 flows from the first shield 31 toward the magnetic pole 30, for example.

As shown in FIG. 2, the first current I1 is supplied to the stacked portion of the magnetic pole 30, the non-magnetic layer 50, and the first shield 31. It is found that when the first current I1 is supplied, an alternating magnetic field is generated from at least one of the magnetic pole 30 or the shield 30S.

For example, in the stacked portion of the magnetic pole 30, the non-magnetic layer 50, and the first shield 31, spin interaction occurs due to an electron flow based on the first current I1. For example, it is considered that magnetization oscillates in a part of the magnetic pole 30 facing the non-magnetic layer 50 and a part of the shield 30S facing the non-magnetic layer 50.

In the embodiment, the non-magnetic layer 50 includes at least one first element selected from the group consisting of Cu, Au, Cr, V, Al, and Ag. The spin interaction is obtained by using such a first element.

In this way, the magnetization oscillates when the first current I1 not less than the threshold value is supplied.

Along with the oscillation, the alternating magnetic field (for example, a high frequency magnetic field) is generated from at least one of the magnetic pole 30 or the shield 30S. The generated alternating magnetic field is applied to the magnetic recording medium 80, and writing to the magnetic recording medium 80 is assisted. For example, MAMR (Microwave Assisted Magnetic Recording) is possible to be performed. A magnetic recording device which is possible to improve the recording density is provided.

As shown in FIG. 1, a thickness of the non-magnetic layer 50 along the direction from the magnetic pole 30 toward the shield 30S is taken as a thickness t50. In the embodiment, the thickness t50 is preferably not less than 2 nm and not more than 50 nm. When the thickness t50 is 2 nm or more, for example, the first shield 31 and a first side shield 35*a* can be easily separated magnetically. When the thickness t50 is not more than 50 nm, for example, the spin interaction can be easily obtained. When the thickness t50 is not more than 50 nm, a function as a shield can be easily obtained, for example. For example, the spread of the writing magnetic field is suppressed and the recording density is improved.

Figure 3:
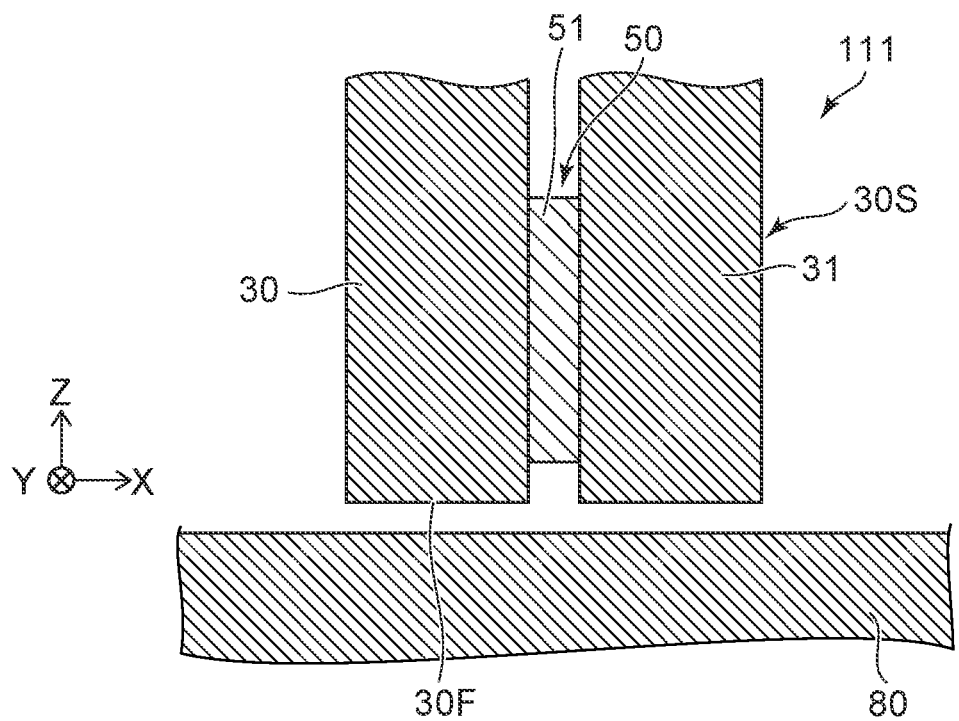
FIG. 3 is a schematic cross-sectional view illustrating a magnetic head according to the first embodiment.

FIG. 3 is a schematic cross-sectional view illustrating a magnetic head according to the first embodiment.

As shown in FIG. 3, in a magnetic head 111 according to the embodiment, the configuration of the non-magnetic layer 50 is different from the configuration in the magnetic head 110. The configuration of the magnetic head 111 other than the above may be the same as the configuration of the magnetic head 110.

In the magnetic head 111, the magnetic pole 30 includes the medium-facing surface 30F. The non-magnetic layer 50 is retracted with reference to the medium-facing surface 30F. In the embodiment, an alternating magnetic field is generated from at least one of the magnetic pole 30 or the shield 30S. For example, the alternating magnetic field generated from the medium-facing surface 30F close to the magnetic recording medium 80 is effectively applied to the magnetic recording medium 80. Since the non-magnetic layer 50 is retracted with reference to the medium-facing surface 30F, the alternating magnetic field is likely to be concentrated and generated near the medium-facing surface 30F. It is easy to obtain a high-strength alternating magnetic field. The alternating magnetic field can be applied to the magnetic recording medium 80 more effectively. It is easy to obtain a higher recording density.

Figure 4:
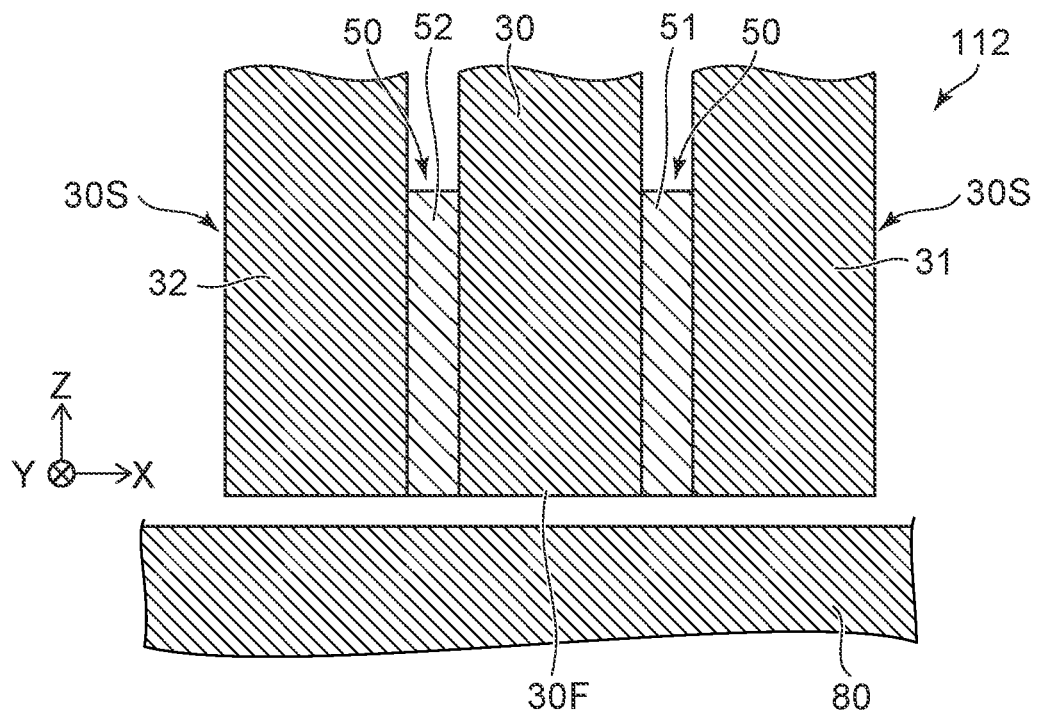
FIG. 4 is a schematic cross-sectional view illustrating a magnetic head according to the first embodiment.

FIG. 4 is a schematic cross-sectional view illustrating a magnetic head according to the first embodiment.

As shown in FIG. 4, in a magnetic head 112 according to the embodiment, the shield 30S includes the first shield 31 and the second shield 32. The non-magnetic layer 50 includes the first non-magnetic layer 51 and a second non-magnetic layer 52. The configuration of the magnetic head 112 other than the above may be the same as the configuration of the magnetic head 110.

The first shield 31 is one of a trailing shield and a leading shield. The second shield 32 is the other one of the trailing shield and the leading shield. Thus, the shield 30S includes the trailing shield and the leading shield.

The first non-magnetic layer 51 is located between the magnetic pole 30 and the trailing shield (first shield 31). The first non-magnetic layer 51 is in contact with the magnetic pole 30 and the trailing shield (first shield 31). The first non-magnetic layer 51 includes at least one selected from the group consisting of Cu, Au, Cr, V, Al and Ag.

The second non-magnetic layer 52 is located between the magnetic pole 30 and the leading shield (second shield 32). The second non-magnetic layer 52 is in contact with the magnetic pole 30 and the leading shield (second shield 32). The second non-magnetic layer 52 includes at least one selected from the group consisting of Cu, Au, Cr, V, Al and Ag.

In the magnetic head 112, an alternating magnetic field (for example, a high frequency magnetic field) is generated from at least one of the magnetic pole 30, the first shield 31, or the second shield 32. The generated alternating magnetic field is applied to the magnetic recording medium 80. More effective MAMR will be performed.

In the magnetic head 112, the first current I1 flows, for example, from the first shield 31 toward the magnetic pole 30 and from the second shield 32 toward the magnetic pole 30.

Figure 5:
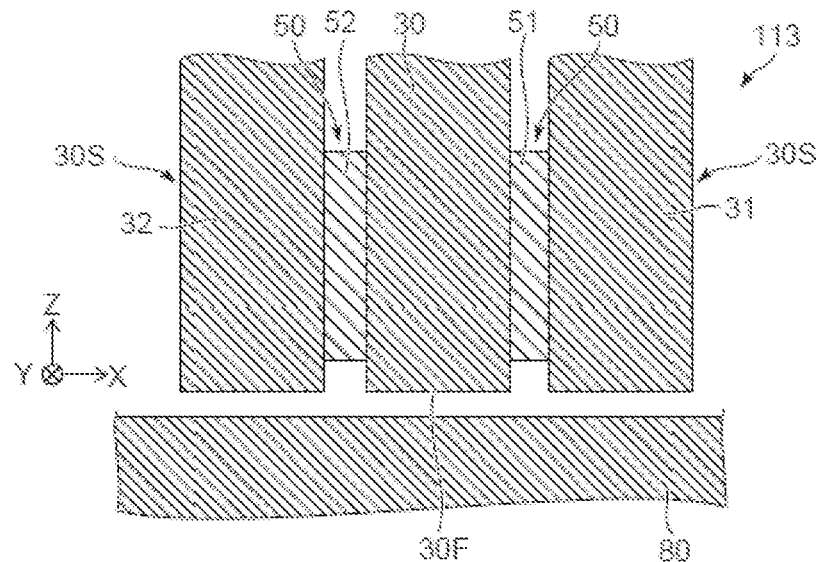
FIG. 5 is a schematic cross-sectional view illustrating a magnetic head according to the first embodiment.

FIG. 5 is a schematic cross-sectional view illustrating a magnetic head according to the first embodiment.

As shown in FIG. 5, in a magnetic head 113 according to the embodiment, the non-magnetic layer 50 (the first non-magnetic layer 51 and the second non-magnetic layer 52) is retracted with reference to the medium-facing surface 30F. The configuration of the magnetic head 113 other than the above may be the same as the configuration of the magnetic head 112.

In the magnetic head 113, since the non-magnetic layer 50 is retracted with reference to the medium-facing surface 30F, an alternating magnetic field is likely to be concentrated and generated near the medium-facing surface 30F. It is easy to obtain a high-strength alternating magnetic field. The alternating magnetic field can be applied to the magnetic recording medium 80 more effectively. It is easy to obtain a higher recording density. At least one of the first non-magnetic layer 51 or the second non-magnetic layer 52 may be retracted with reference to the medium-facing surface 30F.

Figure 6:
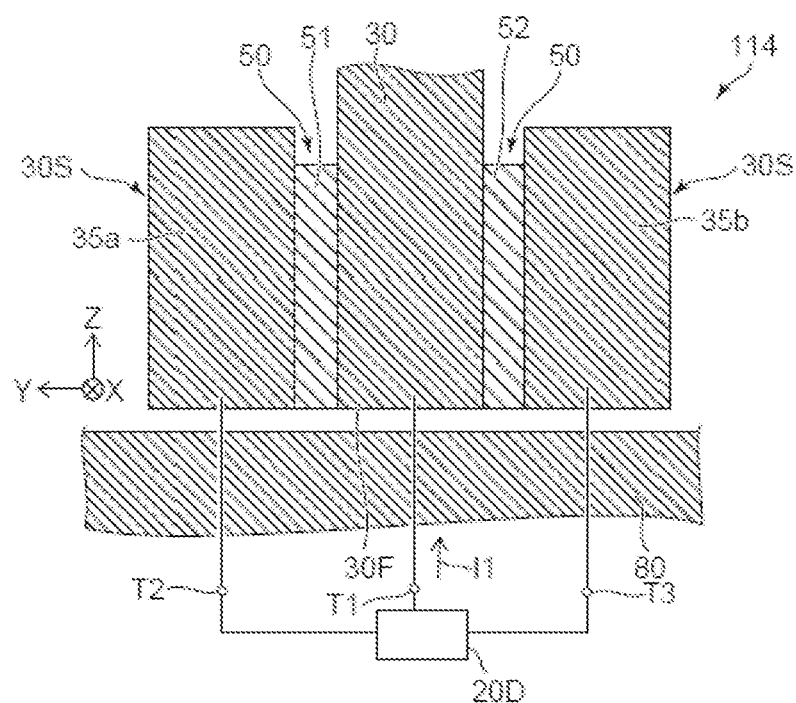
FIG. 6 is a schematic cross-sectional view illustrating a magnetic head according to the first embodiment.

FIG. 6 is a schematic cross-sectional view illustrating a magnetic head according to the first embodiment.

As shown in FIG. 6, in a magnetic head 114 according to the embodiment, the shield 30S may be one of the first side shield 35*a* and the second side shield 35*b*. The configuration of the magnetic head 114 other than the above may be the same as the configuration of the magnetic head 110.

In this example, the shield 30S includes the first side shield 35*a* and the second side shield 35*b*. A direction from the magnetic pole 30 toward the first side shield 35*a* crosses the direction from the magnetic pole 30 toward the first shield 31 (see FIG. 1). A direction from the magnetic pole 30 toward the second side shield 35*b* crosses the direction from the magnetic pole 30 toward the first shield 31 (see FIG. 1). The direction from the magnetic pole 30 toward the first side shield 35*a* and the direction from the magnetic pole 30 toward the second side shield 35*b* are, for example, along the Y-axis direction. At least a part of the magnetic pole 30 is between the first side shield 35*a* and the second side shield 35*b* in the Y-axis direction.

The non-magnetic layer 50 includes, for example, the first non-magnetic layer 51 and the second non-magnetic layer 52. The first non-magnetic layer 51 is located between the magnetic pole 30 and the first side shield 35*a*, and is in contact with the magnetic pole 30 and the first side shield 35*a*. The first non-magnetic layer 51 includes at least one selected from the group consisting of Cu, Au, Cr, V, Al and Ag.

The second non-magnetic layer 52 is located between the magnetic pole 30 and the second side shield 35*b*, and is in contact with the magnetic pole 30 and the second side shield 35*b*. The second non-magnetic layer 52 includes at least one selected from the group consisting of Cu, Au, Cr, V, Al and Ag.

For example, the first current circuit 20D is electrically connected to the magnetic pole 30 via the first terminal T1. The first current circuit 20D is electrically connected to the first side shield 35a via the second terminal T2. The first current circuit 20D is electrically connected to the second side shield 35b via a third terminal T3.

The first current I1 flows through the stacked portion including the magnetic pole 30, the first non-magnetic layer 51, and the first side shield 35a. An alternating magnetic field is generated from at least one of the magnetic pole 30 or the first side shield 35a. The first current I1 flows through the stacked portion including the magnetic pole 30, the second non-magnetic layer 52, and the second side shield 35b. An alternating magnetic field is generated from at least one of the magnetic pole 30 or the second side shield 35b. A stronger alternating magnetic field can be applied to the magnetic recording medium 80. It is easy to obtain a higher recording density.

For example, the first current I1 flows from the first side shield 35a toward the magnetic pole 30, and flows from the second side shield 35b toward the magnetic pole 30. For example, the first current I1 may flow from the first side shield 35a through the magnetic pole 30 toward the second side shield 35b. For example, the first current I1 may flow from the second side shield 35b through the magnetic pole 30 toward the first side shield 35a. In these cases, the first terminal T1 may be omitted.

Figure 7:
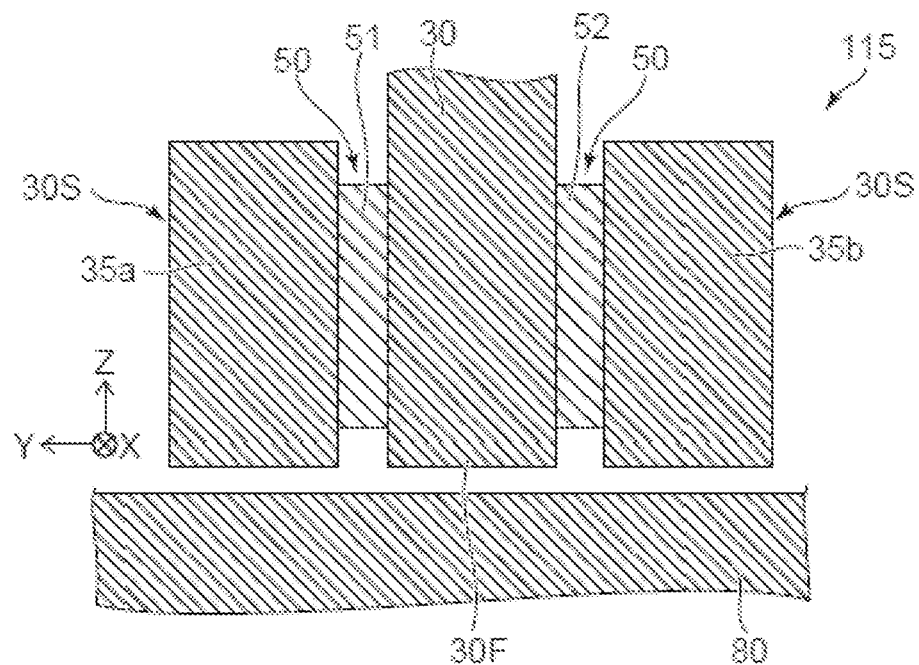
FIG. 7 is a schematic cross-sectional view illustrating a magnetic head according to the first embodiment.

FIG. 7 is a schematic cross-sectional view illustrating a magnetic head according to the first embodiment.

As shown in FIG. 7, in a magnetic head 115 according to the embodiment, the non-magnetic layer 50 (the first non-magnetic layer 51 and the second non-magnetic layer 52) is retracted with reference to the medium-facing surface 30F. The configuration of the magnetic head 115 other than the above may be the same as the configuration of the magnetic head 114.

In the magnetic head 115, since the non-magnetic layer 50 is retracted with reference to the medium-facing surface 30F, an alternating magnetic field is likely to be concentrated and generated near the medium-facing surface 30F. It is easy to obtain a high-strength alternating magnetic field. The alternating magnetic field can be applied to the magnetic recording medium 80 more effectively. It is easy to obtain a higher recording density.

Figure 8:
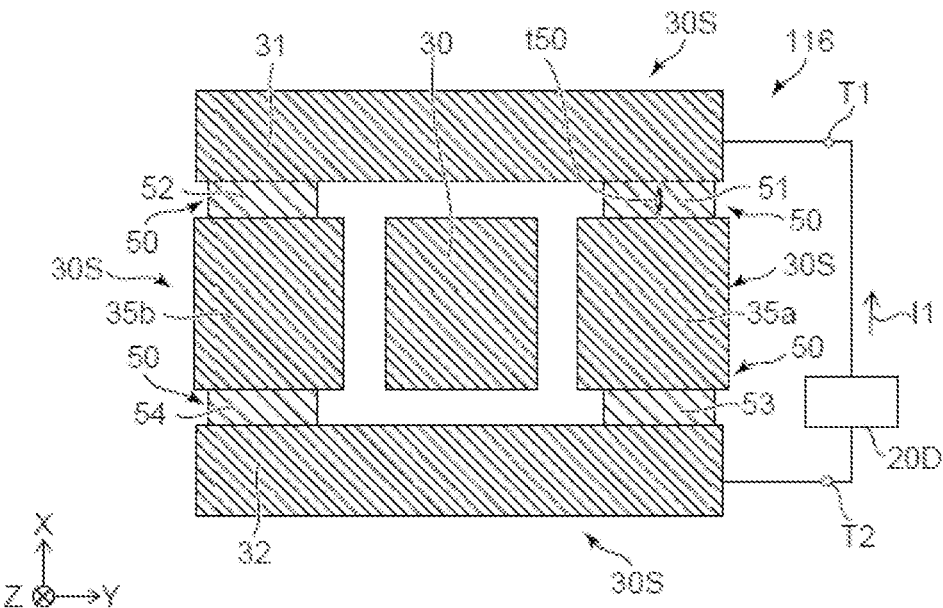
FIG. 8 is a schematic cross-sectional view illustrating a magnetic head according to the first embodiment.

FIG. 8 is a schematic cross-sectional view illustrating a magnetic head according to the first embodiment.

As shown in FIG. 8, a magnetic head 116 according to the embodiment includes the magnetic pole 30, the first shield 31, and the first side shield 35a. The first shield 31 is one of the trailing shield and the leading shield. The direction from the magnetic pole 30 toward the first side shield 35a (for example, the direction along the Y-axis direction) crosses the direction from the magnetic pole 30 toward the first shield 31 (for example, the direction along the X-axis direction).

The non-magnetic layer 50 (for example, the first non-magnetic layer 51) is located between the first shield 31 and the first side shield 35a. The non-magnetic layer 50 (for example, the first non-magnetic layer 51) is in contact with the first shield 31 and the first side shield 35a. The non-magnetic layer 50 (e.g., the first non-magnetic layer 51) includes at least one first element selected from the group consisting of Cu, Au, Cr, V, Al and Ag.

In this example, the magnetic head 116 further includes the second side shield 35b. At least a part of the magnetic pole 30 is between the first side shield 35a and the second side shield 35b.

The non-magnetic layer 50 includes the first non-magnetic layer 51 and the second non-magnetic layer 52. The first non-magnetic layer 51 is located between the first shield 31 and the first side shield 35a, and is in contact with the first shield 31 and the first side shield 35a. The first non-magnetic layer 51 includes at least one selected from the group consisting of Cu, Au, Cr, V, Al and Ag.

The second non-magnetic layer 52 is located between the first shield 31 and the second side shield 35b, and is in contact with the first shield 31 and the second side shield 35b. The second non-magnetic layer 52 includes at least one selected from the group consisting of Cu, Au, Cr, V, Al and Ag.

In this example, the second shield 32 is provided. The second shield 32 is the other one of the trailing shield and the leading shield.

The non-magnetic layer 50 includes a third non-magnetic layer 53 and a fourth non-magnetic layer 54. The third non-magnetic layer 53 is located between the second shield 32 and the first side shield 35a, and is in contact with the second shield 32 and the first side shield 35a. The third non-magnetic layer 53 includes at least one selected from the group consisting of Cu, Au, Cr, V, Al and Ag.

The fourth non-magnetic layer 54 is located between the second shield 32 and the second side shield 35b, and is in contact with the second shield 32 and the second side shield 35b. The fourth non-magnetic layer 54 includes at least one selected from the group consisting of Cu, Au, Cr, V, Al and Ag.

For example, the first current circuit 20D is electrically connected to the first shield 31 via the first terminal T1. The first current circuit 20D is electrically connected to the second shield 32 via the second terminal T2. The first current I1 flows through the stacked portion including the first shield 31, the first non-magnetic layer 51, and the first side shield 35a. The first current I1 flows through the stacked portion including the first shield 31, the second non-magnetic layer 52, and the second side shield 35b. The first current I1 flows through the stacked portion including the second shield 32, the third non-magnetic layer 53, and the first side shield 35a. The first current I1 flows through the stacked portion including the second shield 32, the fourth non-magnetic layer 54, and the second side shield 35b.

For example, an alternating magnetic field is generated in at least one of the first shield 31, the first side shield 35a, the second shield 32, or the second side shield 35b. The generated alternating magnetic field is applied to the magnetic recording medium 80 (see FIG. 1). It is easy to obtain a higher recording density.

As shown in FIG. 8, a thickness of the non-magnetic layer 50 (for example, the first non-magnetic layer 51) along the direction from the first shield 31 toward the first side shield 35a is taken as a thickness t50. In the embodiment, the thickness t50 is preferably not less than 2 nm and not more than 30 nm. Since the thickness t50 is not less than 2 nm, for example, the first shield 31 and the first side shield 35a is easily separated magnetically. Since the thickness t50 is not more than 50 nm, for example, spin interaction is easily obtained. Since the thickness t50 is not more than 50 nm, it is easy to obtain a function as a shield, for example. For example, the spread of the writing magnetic field is suppressed and the recording density is improved.

Figure 9:
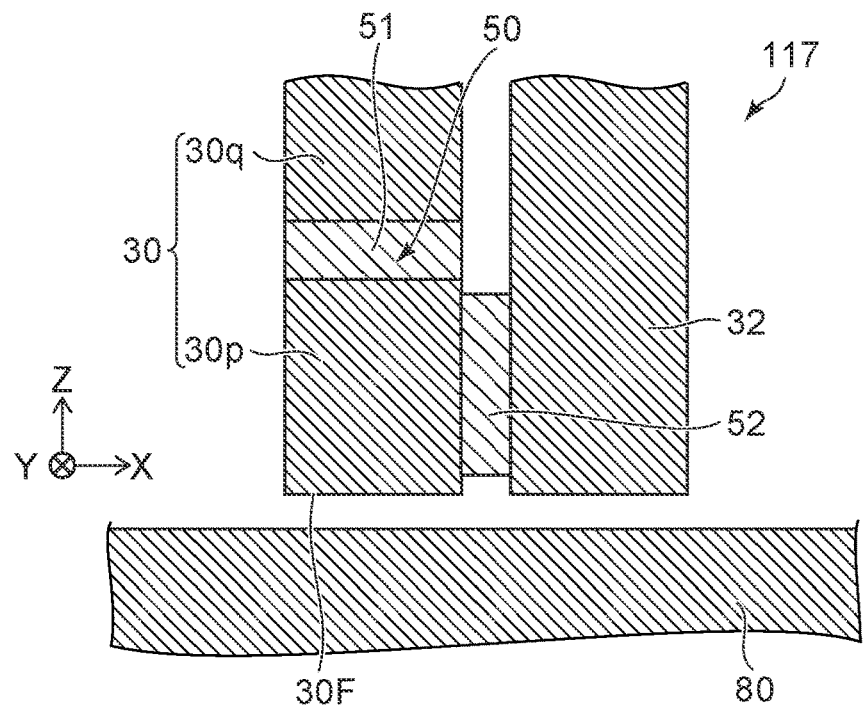
FIG. 9 is a schematic cross-sectional view illustrating a magnetic head according to the first embodiment.

FIG. 9 is a schematic cross-sectional view illustrating a magnetic head according to the first embodiment.

As shown in FIG. 9, a magnetic head 117 according to the embodiment includes the magnetic pole 30 and the non-magnetic layer 50. In the magnetic head 117, a position of the non-magnetic layer 50 is different from that in the magnetic head 110. The configuration of the magnetic head 117 other than the above may be the same as the configuration of the magnetic head 110.

In the magnetic head 117, the magnetic pole 30 includes a first partial region 30p and a second partial region 30q. The non-magnetic layer 50 (for example, the first non-magnetic layer 51) is located between the first partial region 30p and the second partial region 30q. The non-magnetic layer 50 includes at least one first element selected from the group consisting of Cu, Au, Cr, V, Al and Ag. For example, the magnetic pole 30 includes the medium-facing surface 30F. The first partial region 30p is between the medium facing surface 30F and the second partial region 30q. The non-magnetic layer 50 may be in contact with the first partial region 30p and the second partial region 30q.

For example, the first current I1 flows from the first partial region 30p toward the second partial region 30q via the first non-magnetic layer 51. For example, the first current I1 may flow from the second partial region 30q toward the first partial region 30p via the first non-magnetic layer 51. In the magnetic head 117, an alternating magnetic field is generated from the magnetic pole 30 by the first current I1. The generated alternating magnetic field is applied to the magnetic recording medium 80. It is easy to obtain a higher recording density.

In this example, the second non-magnetic layer 52 is located between the magnetic pole 30 and the first shield 31. The second non-magnetic layer 52 is conductive. For example, the first current I1 flows through the stacked portion of the magnetic pole 30, the second non-magnetic layer 52, and the first shield 31. The second non-magnetic layer 52 includes, for example, at least one selected from the group consisting of Ru, Ir, Ta, Rh, Pd, Pt and W. The second non-magnetic layer 52 may include, for example, at least one first element selected from the group consisting of Cu, Au, Cr, V, Al and Ag. In this case, similarly to the above, the alternating magnetic field is generated from at least one of the magnetic pole 30 or the first shield 31 based on the first current I1.

As shown in FIG. 9, the second non-magnetic layer 52 may be retracted with reference to the medium-facing surface 30F. The alternating magnetic field is likely to be concentrated near the medium-facing surface 30F. It is easy to obtain a high-strength alternating magnetic field. The alternating magnetic field can be applied to the magnetic recording medium 80 more effectively. It is easy to obtain a higher recording density.

The magnetic recording device 210 (see FIG. 2) according to the embodiment includes the above-mentioned magnetic heads (magnetic heads 110 to 117) and the first current circuit 20D. The first current circuit 20D is possible to supply the first current I1 between the magnetic pole 30 and the shield 30S. When the first current I1 is supplied between the magnetic pole 30 and the shield 30S, the alternating magnetic field is generated from at least one of the magnetic pole 30 or the shield 30S. A magnetic recording device which is possible to improve the recording density is provided.

Second Embodiment

Figure 10:
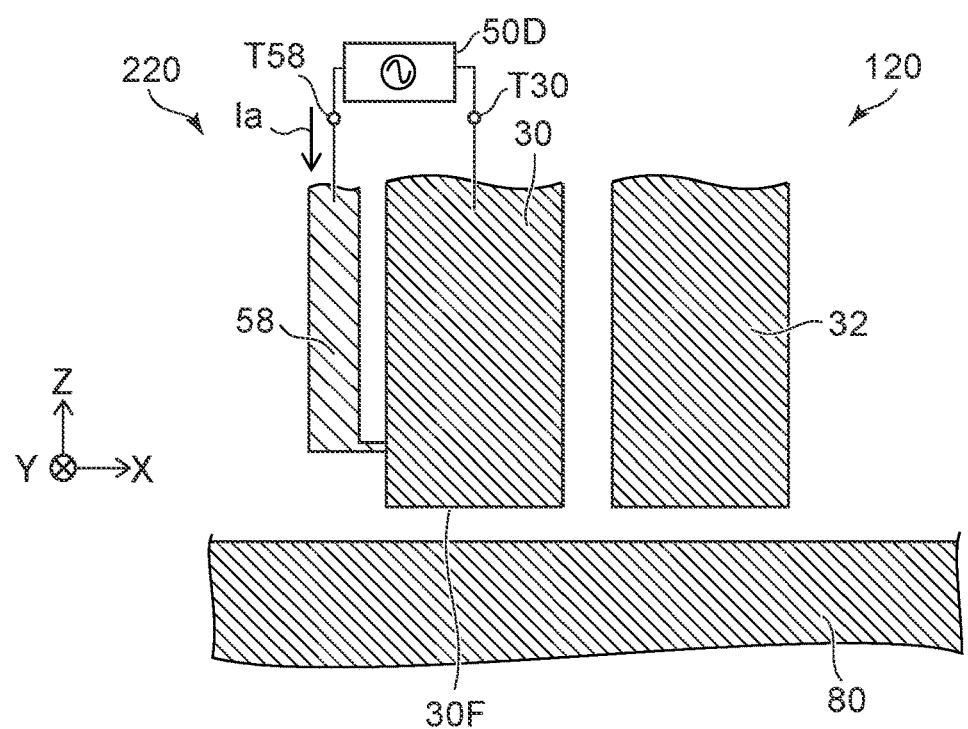
FIG. 10 is a schematic cross-sectional view illustrating a magnetic head according to a second embodiment.

FIG. 10 is a schematic cross-sectional view illustrating a magnetic head according to a second embodiment.

As shown in FIG. 10, a magnetic head 120 according to the embodiment includes the magnetic pole 30 and a conductive member 58. The configuration of the magnetic head 120 other than the above may be the same as the configuration of the magnetic head 110.

In the magnetic head 120, the conductive member 58 is electrically connected to the magnetic pole 30. An AC current Ia is supplied to the conductive member 58 and the magnetic pole 30. At this time, an alternating magnetic field is generated from the magnetic pole 30.

For example, a magnetic pole terminal T30 electrically connected to the magnetic pole 30 and a conductive member terminal T58 electrically connected to the conductive member 58 are provided. A magnetic recording device 220 includes the magnetic head 120 and an AC current circuit 50D. The AC current circuit 50D is electrically connected to the magnetic pole 30 via the magnetic pole terminal T30. The AC current circuit 50D is electrically connected to the conductive member 58 via the conductive member terminal T58.

The AC current circuit 50D is possible to supply the AC current Ia to the magnetic pole 30 and the conductive member 58 via these terminals. When the AC current Ia is supplied to the magnetic pole 30 and the conductive member 58, an alternating magnetic field is generated from the magnetic pole 30. The generated alternating magnetic field is applied to the magnetic recording medium 80. MAMR is effectively performed.

Figure 11:
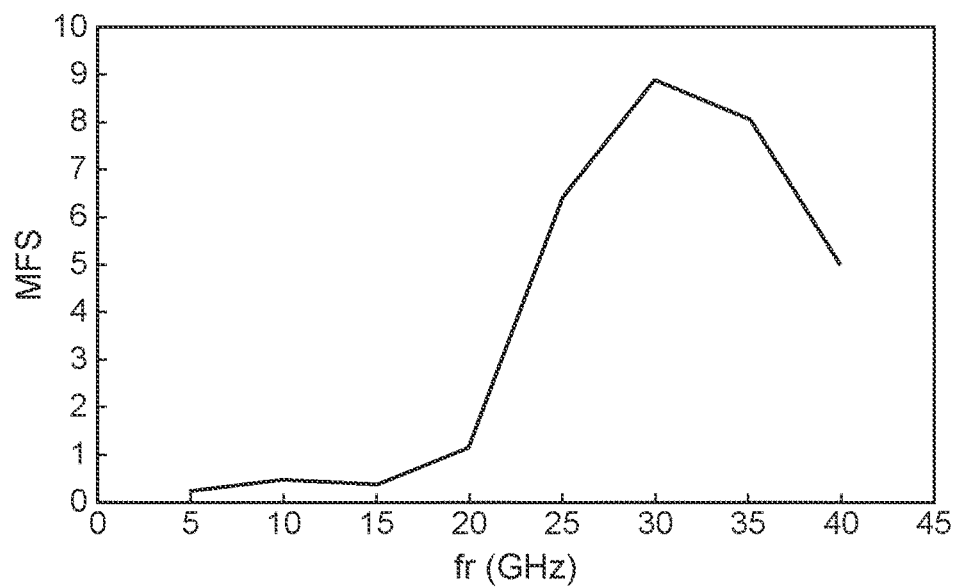
FIG. 11 is a graph illustrating characteristics of the magnetic head according to the embodiment.

FIG. 11 is a graph illustrating characteristics of the magnetic head according to the embodiment.

FIG. 11 illustrates the simulation result of the characteristics of the alternating magnetic field obtained from the magnetic pole 30 when a high frequency magnetic field is applied in the vicinity of the magnetic head including the magnetic pole 30. The horizontal axis of FIG. 11 is a frequency fr of the applied high frequency magnetic field. The vertical axis is a strength MFS (relative value) of the alternating magnetic field obtained from the magnetic pole 30.

As shown in FIG. 11, at the frequency fr of about 30 GHz, the strength MFS of the alternating magnetic field shows a peak. This is considered to correspond to the fact that at least a part of the magnetic pole 30 resonates with the applied high frequency magnetic field.

By supplying the AC current Ia to the conductive member 58 and the magnetic pole 30, the magnetic field generated by the AC current Ia is applied to the magnetic pole 30. It is considered that the magnetization of the magnetic pole 30 resonates with the AC current Ia due to the energy caused by the AC current Ia.

For example, when the AC current Ia passes through the magnetic pole 30, the alternating magnetic field based on resonance at the magnetic pole 30 is applied to the magnetic recording medium 80. MAMR is performed. A part of the alternating magnetic field based on the AC current Ia flowing through the conductive member 58 may be further applied to the magnetic recording medium 80. More effective MAMR will be performed.

Third Embodiment

Figure 12:
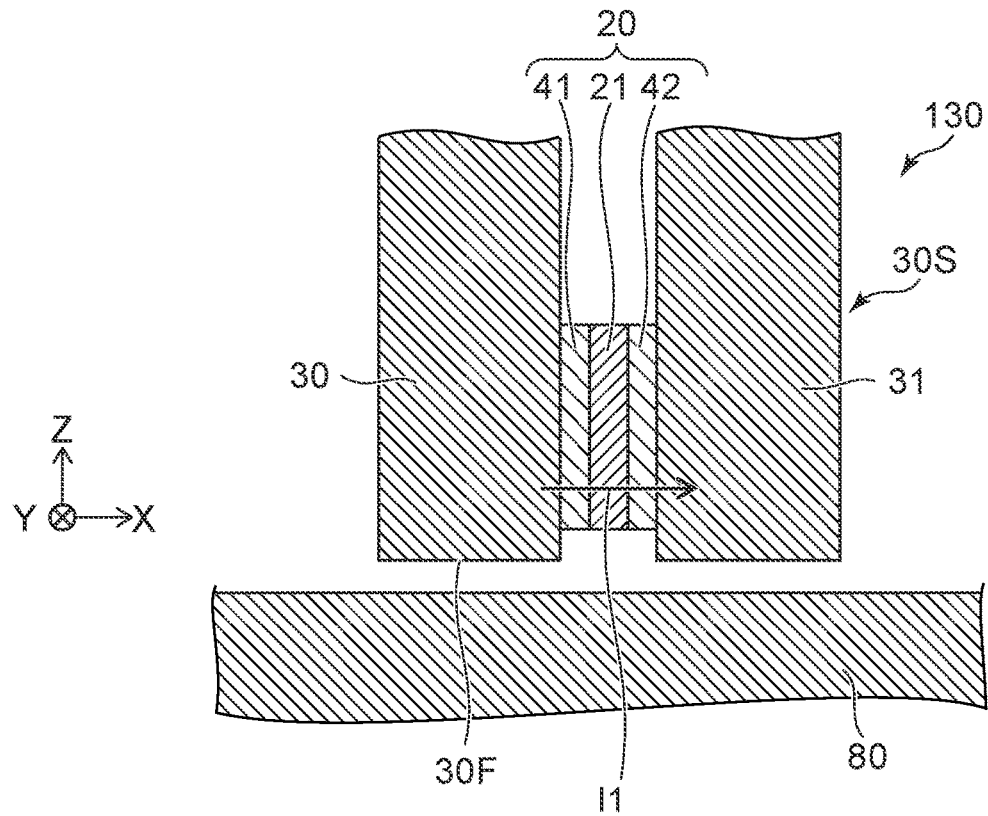
FIG. 12 is a schematic cross-sectional view illustrating a magnetic head according to a third embodiment.

FIG. 12 is a schematic cross-sectional view illustrating a magnetic head according to a third embodiment.

Figure 13:
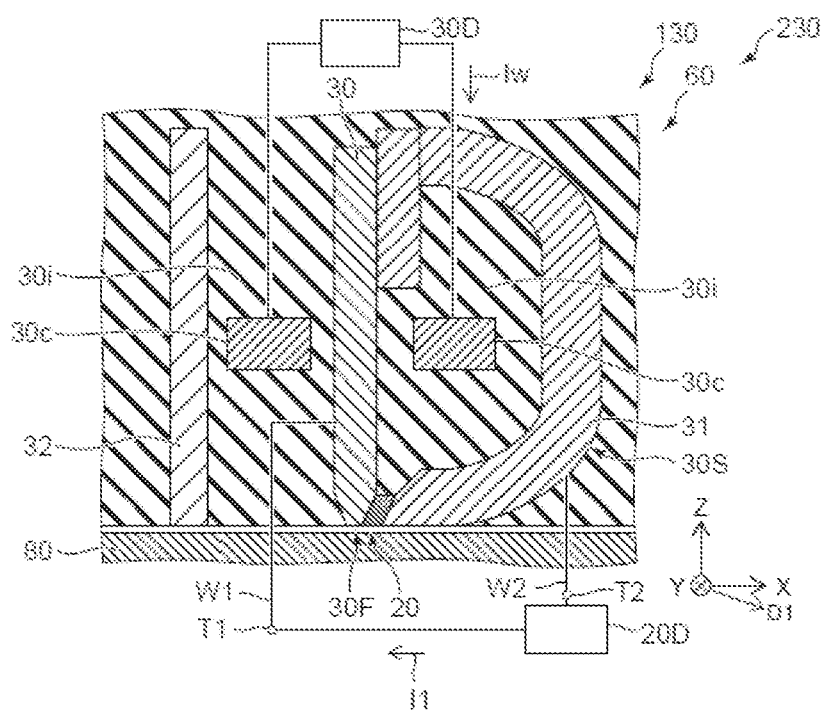
FIG. 13 is a schematic cross-sectional view illustrating a magnetic recording device according to the third embodiment.

FIG. 13 is a schematic cross-sectional view illustrating a magnetic recording device according to the third embodiment.

As shown in FIG. 13, a magnetic recording device 230 according to the embodiment includes a magnetic head 130 and the first current circuit 20D. The magnetic recording device 230 may include the magnetic recording medium 80.

At least the recording operation is performed in the magnetic recording device 230. In the recording operation, information is recorded on the magnetic recording medium 80 by using the magnetic head 130.

As shown in FIG. 13, the magnetic head 130 includes the magnetic pole 30, the shield 30S, and a stacked body 20. In this example, the shield 30S includes the first shield 31. The shield 30S may include the second shield 32.

As shown in FIG. 12, the stacked body 20 includes a first magnetic layer 21, a first non-magnetic layer 41, and a second non-magnetic layer 42. The first non-magnetic layer 41 is located between the magnetic pole 30 and the first magnetic layer 21. The first non-magnetic layer 41 includes one of the first material and the second material. The first material includes at least one selected from the group consisting of Cu, Au, Cr, V, Al and Ag. The second material includes at least one selected from the group consisting of Ru, Ir, Ta, Rh, Pd, Pt and W. The second non-magnetic layer 42 is located between the first magnetic layer 21 and the shield 30S (for example, the first shield 31). The second non-magnetic layer 42 includes the other one of the first material and the second material.

As shown in FIG. 13, the first current I1 (for example, a DC current may be used) is supplied to the stacked body 20 from the first current circuit 20D. The electron flow associated with the first current I1 acts on the stacked body 20. The direction of the electron flow is opposite to the direction of the first current I1. Since the first current I1 flows through the stacked body 20, an alternating magnetic field is generated from the stacked body 20.

In the embodiment, at least one of the magnetic pole 30 or the shield 30S resonates with the stacked body 20. For example, at least one of the magnetic pole 30 or the shield 30S oscillates as the stacked body 20 oscillates. As a result, an alternating magnetic field is generated from at least one of the magnetic pole 30 or the shield 30S. The alternating magnetic field generated from at least one of the magnetic pole 30 or the shield 30S is also applied to the magnetic recording medium 80. MAMR is performed. The alternating magnetic field generated from the stacked body 20 may be further utilized. More effective MAMR can be performed.

For example, the strength of the alternating magnetic field generated from at least one of the magnetic pole 30 or the shield 30S is higher than the strength of the alternating magnetic field generated from the stacked body 20. At least one of the magnetic pole 30 or the shield 30S has an action of amplifying, for example, the alternating magnetic field generated from the stacked body 20.

The magnetic head 130 can provide a magnetic head and a magnetic recording device which are possible to improve the recording density.

As shown in FIG. 12, the stacked body 20 may be retracted with reference to the medium-facing surface 30F of the magnetic pole 30. The alternating magnetic field is concentrated in the vicinity of the medium-facing surface 30F of the magnetic pole 30. More effective MAMR can be performed.

Figure 14:
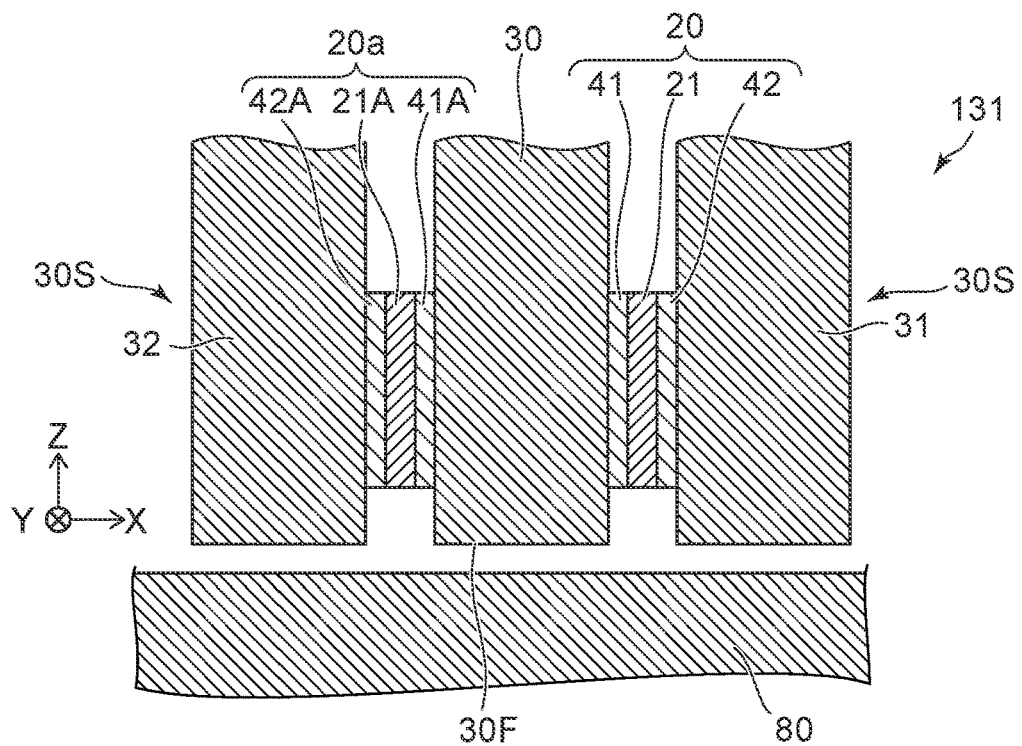
FIG. 14 is a schematic cross-sectional view illustrating a magnetic head according to the third embodiment.

FIG. 14 is a schematic cross-sectional view illustrating a magnetic head according to the third embodiment.

As shown in FIG. 14, in the magnetic head 131 according to the embodiment, the shield 30S includes the first shield 31 and the second shield 32. The stacked body 20 is provided between the magnetic pole 30 and the first shield 31. Another stacked body 20a is provided between the magnetic pole 30 and the second shield 32. The configuration of the stacked body 20a may be the same as the configuration of the stacked body 20. For example, the stacked body 20a includes a magnetic layer 21A, a non-magnetic layer 41A, and a non-magnetic layer 42A.

The first current I1 flows from the second shield 32 to the first shield 31 via the magnetic pole 30, for example. In this case, the first non-magnetic layer 41 and the non-magnetic layer 42A include the above-mentioned first material (at least one selected from the group consisting of Cu, Au, Cr, V, Al and Ag). The second non-magnetic layer 42 and the non-magnetic layer 41A include the above-mentioned second material (at least one selected from the group consisting of Ru, Ir, Ta, Rh, Pd, Pt and W).

The first current I1 may flow from the first shield 31 to the second shield 32 via the magnetic pole 30, for example. In this case, the second non-magnetic layer 42 and the non-magnetic layer 41A include the above-mentioned first material. The first non-magnetic layer 41 and the non-magnetic layer 42A include the above-mentioned second material.

A part of the first current I1 may flow from the magnetic pole 30 to the first shield 31, and another part of the first current I1 may flow from the magnetic pole 30 to the second shield 32, for example. In this case, the first non-magnetic layer 41 and the non-magnetic layer 41A include the above-mentioned first material. The second non-magnetic layer 42 and the non-magnetic layer 42A include the above-mentioned second material.

A part of the first current I1 may flow from, for example, the first shield 31 to the magnetic pole 30, and another part of the first current I1 may flow from, for example, the second shield 32 to the magnetic pole 30. In this case, the second non-magnetic layer 42 and the non-magnetic layer 42A include the above-mentioned first material. The first non-magnetic layer 41 and the non-magnetic layer 41A include the above-mentioned second material.

As shown in FIG. 14, the stacked body 20 and the stacked body 20a may be retracted with reference to the medium-facing surface 30F of the magnetic pole 30.

Figure 15:
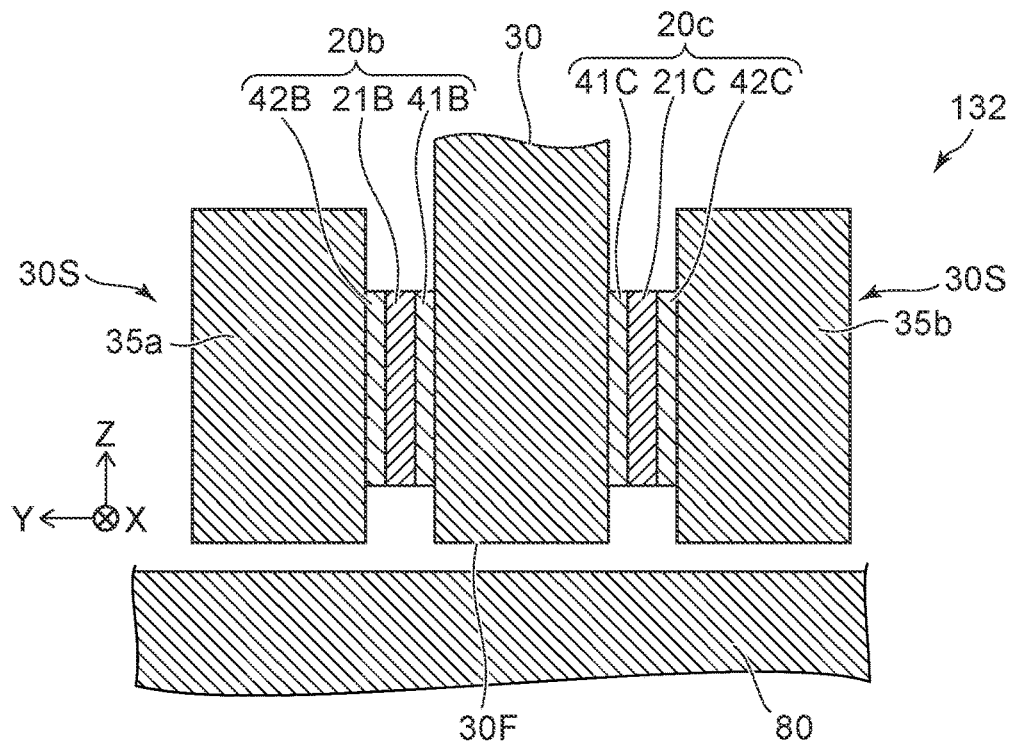
FIG. 15 is a schematic cross-sectional view illustrating a magnetic head according to the third embodiment.

FIG. 15 is a schematic cross-sectional view illustrating a magnetic head according to the third embodiment.

As shown in FIG. 15, in a magnetic head 132 according to the embodiment, the first side shield 35a and the second side shield 35b are provided as the shield 30S. A stacked body 20b is provided between the magnetic pole 30 and the first side shield 35a. A stacked body 20c is provided between the magnetic pole 30 and the second side shield 35b. The configuration of the stacked body 20b and the stacked body 20c may be the same as the configuration of the stacked body 20. For example, the stacked body 20b includes a magnetic layer 21B, a non-magnetic layer 41B, and a non-magnetic layer 42B. For example, the stacked body 20c includes a magnetic layer 21C, a non-magnetic layer 41C, and a non-magnetic layer 42C.

For example, the first current I1 flows from the first side shield 35a to the second side shield 35b via the magnetic pole 30. In this case, the non-magnetic layer 42B and the non-magnetic layer 41C include the above-mentioned first material (at least one selected from the group consisting of Cu, Au, Cr, V, Al and Ag). The non-magnetic layer 41B and the non-magnetic layer 42C include the above-mentioned second material (at least one selected from the group consisting of Ru, Ir, Ta, Rh, Pd, Pt and W).

For example, the first current I1 may flow from the second side shield 35b to the first side shield 35a via the magnetic pole 30. In this case, the non-magnetic layer 41B and the non-magnetic layer 42C include the above-mentioned first material. The non-magnetic layer 42B and the non-magnetic layer 41C include the above-mentioned second material.

A part of the first current I1 may flow from the magnetic pole 30 to the first side shield 35a, for example, and another part of the first current I1 may flow from the magnetic pole 30 to the second side shield 35b, for example. In this case, the non-magnetic layer 41B and the non-magnetic layer 41C include the above-mentioned first material. The non-magnetic layer 42B and the non-magnetic layer 42C include the above-mentioned second material.

A part of the first current I1 may flow from, for example, the first side shield 35a to the magnetic pole 30, and another part of the first current I1 may flow from, for example, the second side shield 35b to the magnetic pole 30. In this case, the non-magnetic layer 42B and the non-magnetic layer 42C include the above-mentioned first material. The non-magnetic layer 41B and the non-magnetic layer 41C include the above-mentioned second material.

As shown in FIG. 15, the stacked body 20b and the stacked body 20c may be retracted with reference to the medium-facing surface 30F of the magnetic pole 30.

Figure 16:
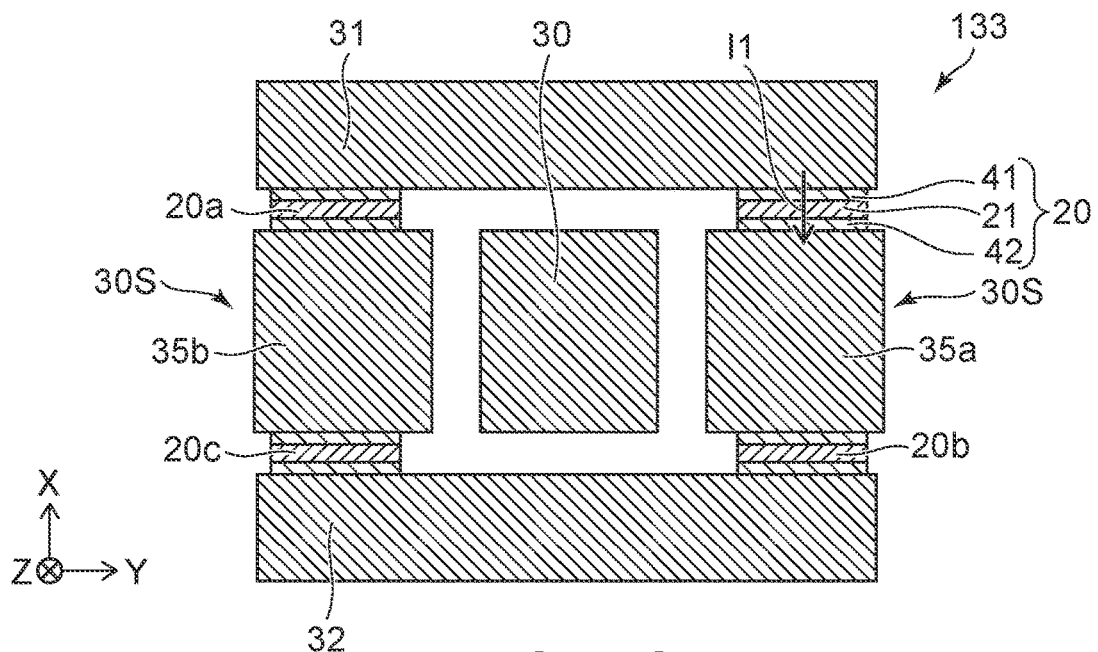
FIG. 16 is a schematic cross-sectional view illustrating a magnetic head according to the third embodiment.

FIG. 16 is a schematic cross-sectional view illustrating a magnetic head according to the third embodiment.

As shown in FIG. 16, a magnetic head 133 according to the embodiment includes the magnetic pole 30, the first shield 31, and the first side shield 35a. The configuration of the magnetic head 133 other than the above may be the same as the configuration of the magnetic head 130, for example.

In the magnetic head 133, the first shield 31 is one of the trailing shield and the leading shield. The direction from the magnetic pole 30 toward the first side shield 35a (for example, the direction along the Y-axis direction) crosses the direction from the magnetic pole 30 toward the first shield 31 (for example, the direction along the X-axis direction).

The stacked body 20 is provided between the first shield 31 and the first side shield 35a. The stacked body 20 includes the first magnetic layer 21, the first non-magnetic layer 41, and the second non-magnetic layer 42. The first non-magnetic layer 41 is located between the first magnetic layer 21 and the first shield 31. The first non-magnetic layer 41 includes at least one selected from the group consisting of Cu, Au, Cr, V, Al and Ag. The second non-magnetic layer 42 is located between the first magnetic layer 21 and the first side shield 35a. The second non-magnetic layer 42 includes at least one selected from the group consisting of Ru, Jr, Ta, Rh, Pd, Pt and W.

For example, the first current I1 flows from the first shield 31 to the first side shield 35a. For example, an alternating magnetic field is generated from the stacked body 20 by the first current I1. At least one of the first shield 31, the first side shield 35a, or the magnetic pole 30 resonates with the stacked body 20.

As shown in FIG. 16, the magnetic head 133 may include the second shield 32 and the second side shield 35b. Another stacked body 20a is provided between the first shield 31 and the second side shield 35b. Another stacked body 20b is provided between the second shield 32 and the first side shield 35a. Another stacked body 20c is provided between the second shield 32 and the second side shield 35b.

An alternating magnetic field is generated in the stacked body 20a, the stacked body 20b, and the stacked body 20c. At least one of the first shield 31, the second shield 32, the first side shield 35a, or the second side shield 35b resonates with the stacked body 20, the stacked body 20a, the stacked body 20b, and the stacked body 20c. More effective MAMR can be performed.

Figure 17:
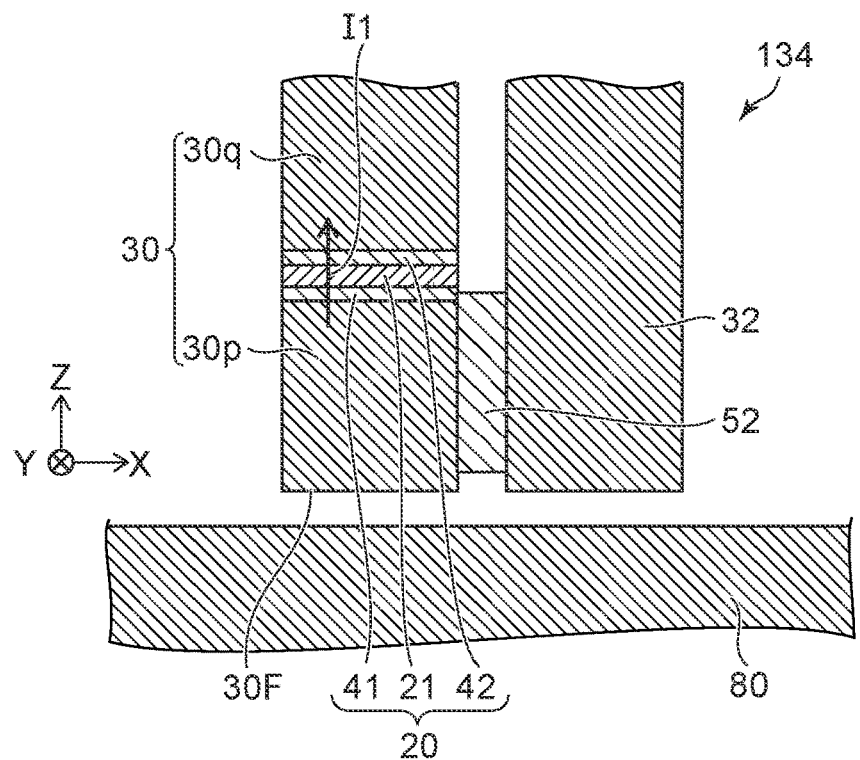
FIG. 17 is a schematic cross-sectional view illustrating a magnetic head according to the third embodiment.

FIG. 17 is a schematic cross-sectional view illustrating a magnetic head according to the third embodiment.

As shown in FIG. 17, a magnetic head 134 according to the embodiment includes the magnetic pole 30 and the stacked body 20. In the magnetic head 134, the configuration of the stacked body 20 is different from the configuration in the magnetic head 130. The configuration of the magnetic head 134 other than the above may be the same as the configuration of the magnetic head 130, for example.

In the magnetic head 134, the magnetic pole 30 includes a first partial region 30p and a second partial region 30q. The stacked body 20 is provided between the first partial region 30p and the second partial region 30q. The stacked body 20 includes the first magnetic layer 21, the first non-magnetic layer 41, and the second non-magnetic layer 42. The first non-magnetic layer 41 is provided between the first partial region 30p and the first magnetic layer 21. For example, the magnetic pole 30 includes the medium-facing surface 30F. The first partial region 30p is between the medium-facing surface 30F and the second partial region 30q. The non-magnetic layer 50 may be in contact with the first partial region 30p and the second partial region 30q. The first non-magnetic layer 41 includes one of the first material and the second material. The second non-magnetic layer 42 includes the other one of the first material and the second material. The first material includes at least one selected from the group consisting of Cu, Au, Cr, V, Al and Ag. The second material includes at least one selected from the group consisting of Ru, Ir, Ta, Rh, Pd, Pt and W.

For example, the first current I1 is supplied to the stacked body 20. An alternating magnetic field is generated from the stacked body 20. In the embodiment, at least a part of the magnetic pole 30 resonates with the stacked body 20. For example, the alternating magnetic field is generated from the magnetic pole 30. More effective MAMR can be performed.

For example, the first current I1 has an orientation from the first partial region 30p to the second partial region 30q. In this case, the first non-magnetic layer 41 includes a first material (at least one selected from the group consisting of Cu, Au, Cr, V, Al and Ag). The second non-magnetic layer 42 includes a second material (at least one selected from the group consisting of Ru, Ir, Ta, Rh, Pd, Pt and W).

For example, the first current I1 may have an orientation from the second partial region 30q to the first partial region 30p. In this case, the first non-magnetic layer 41 includes the second material, and the second non-magnetic layer 42 includes the first material.

Hereinafter, an example of the magnetic head and the magnetic recording device according to the embodiment will be described.

Figure 18:
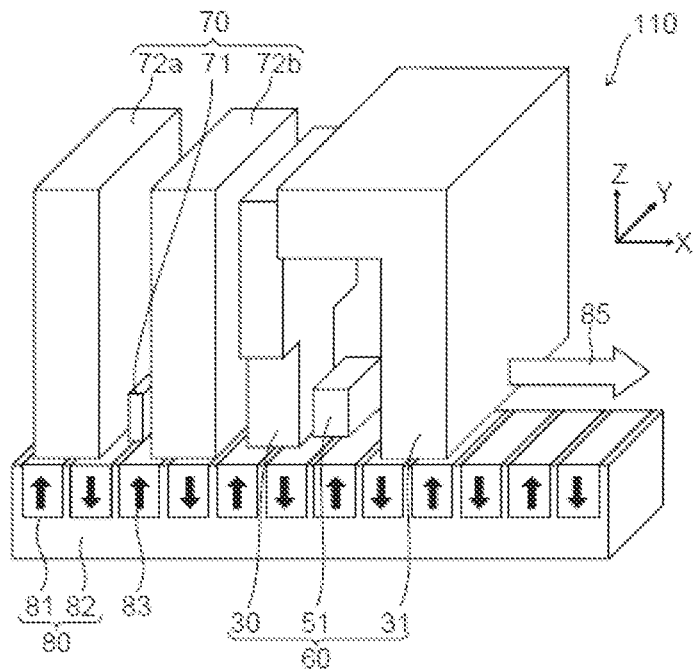
FIG. 18 is a schematic perspective view illustrating the magnetic recording device according to the embodiment.

FIG. 18 is a schematic perspective view illustrating the magnetic recording device according to the embodiment.

As shown in FIG. 18, the magnetic head according to the embodiment (for example, the magnetic head 110) is used together with the magnetic recording medium 80. In this example, the magnetic head 110 includes a recording part 60 and a reproducing part 70. Information is recorded on the magnetic recording medium 80 by the recording part 60 of the magnetic head 110. The reproducing part 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording part 60.

The reproducing part 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 can output a signal corresponding to the magnetization 83 of the magnetic recording layer 81.

As shown in FIG. 18, the magnetic recording medium 80 moves relative to the magnetic head 110 in the direction of the medium movement direction 85. The magnetic head 110 controls the information corresponding to the magnetization 83 of the magnetic recording layer 81 at an arbitrary position. The magnetic head 110 reproduces the information corresponding to the magnetization 83 of the magnetic recording layer 81 at an arbitrary position.

Figure 19:
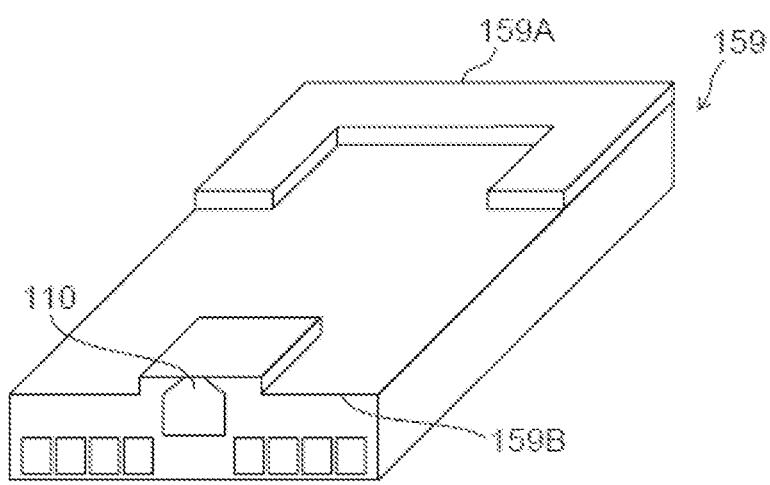
FIG. 19 is a schematic perspective view illustrating a part of the magnetic recording device according to the embodiment.

FIG. 19 is a schematic perspective view illustrating a part of the magnetic recording device according to the embodiment.

FIG. 19 illustrates a head slider.

The magnetic head 110 is provided on a head slider 159. The head slider 159 includes, for example, $Al_2O_3$/TiC and the like. The head slider 159 moves relative to the magnetic recording medium while floating or contacting the magnetic recording medium.

The head slider 159 has, for example, an air inflow side 159A and an air outflow side 159B. The magnetic head 110 is arranged on the side surface of the air outflow side 159B of the head slider 159. As a result, the magnetic head 110 moves relative to the magnetic recording medium while floating or contacting the magnetic recording medium.

Figure 20:
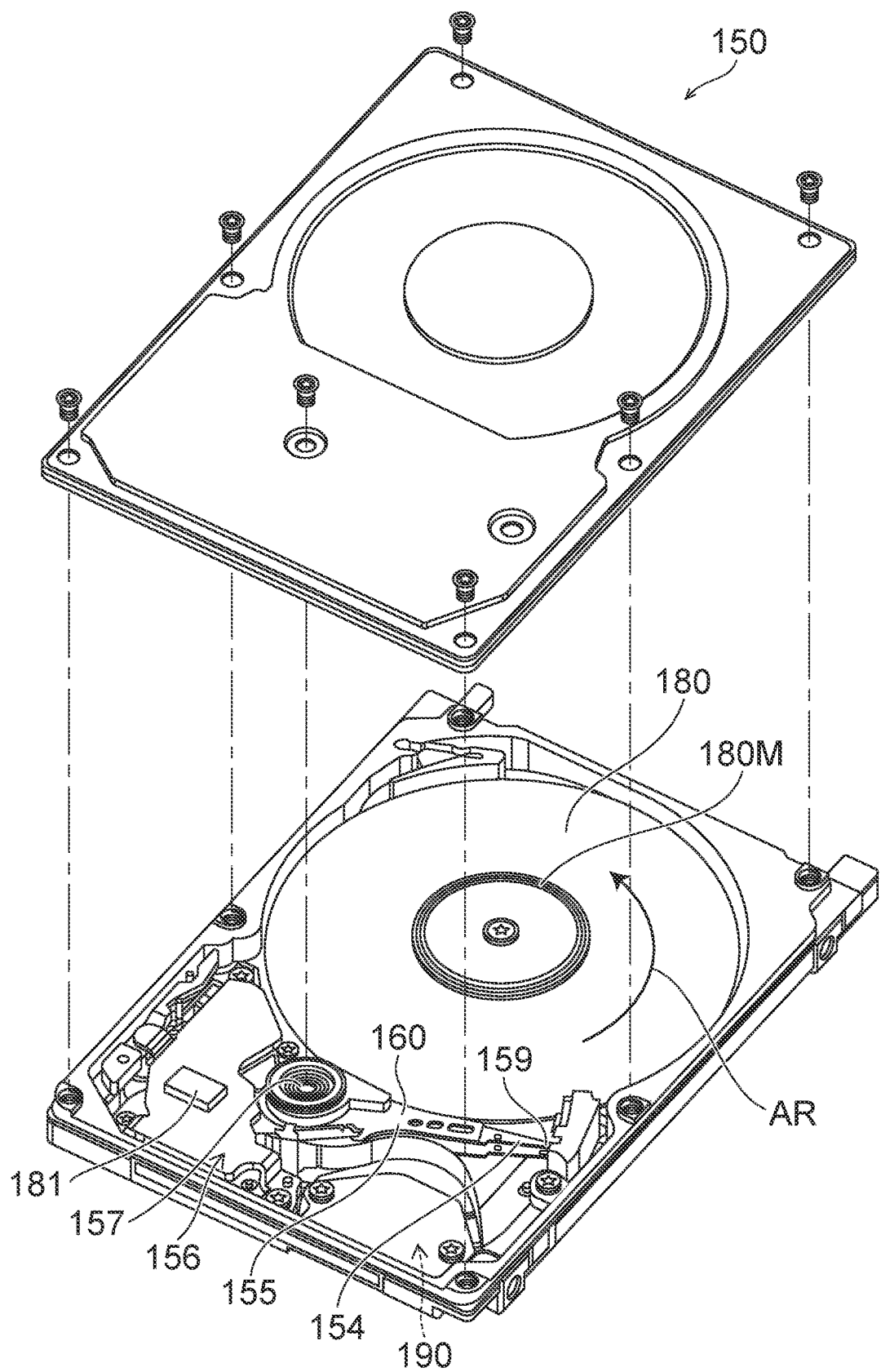
FIG. 20 is a schematic perspective view illustrating a magnetic recording device according to the embodiment.

FIG. 20 is a schematic perspective view illustrating a magnetic recording device according to the embodiment.

Figure 21A:
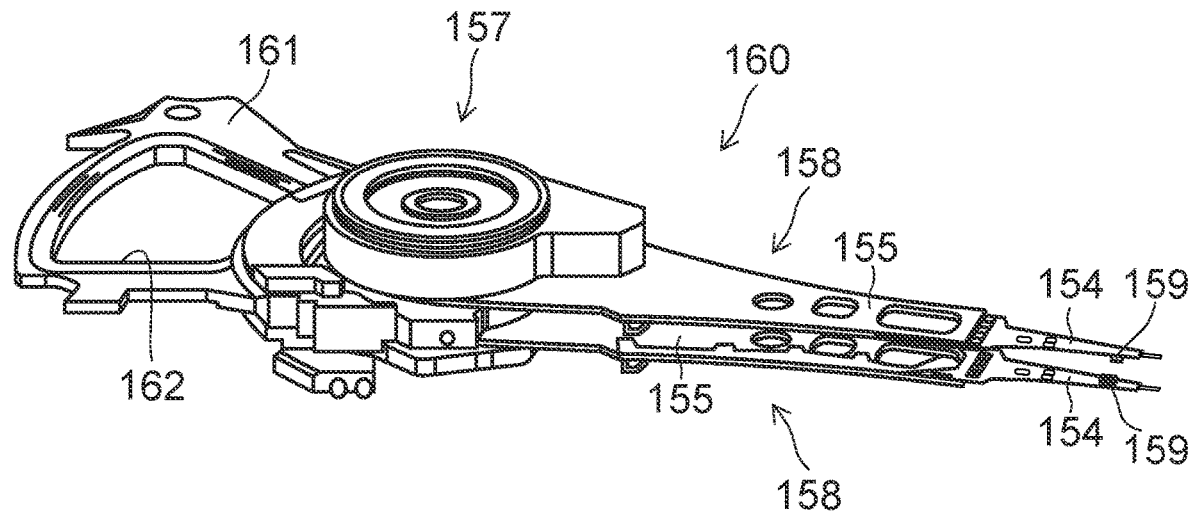
FIGS. 21A and 21B are schematic perspective views illustrating a part of the magnetic recording device according to the embodiment.
Figure 21B:
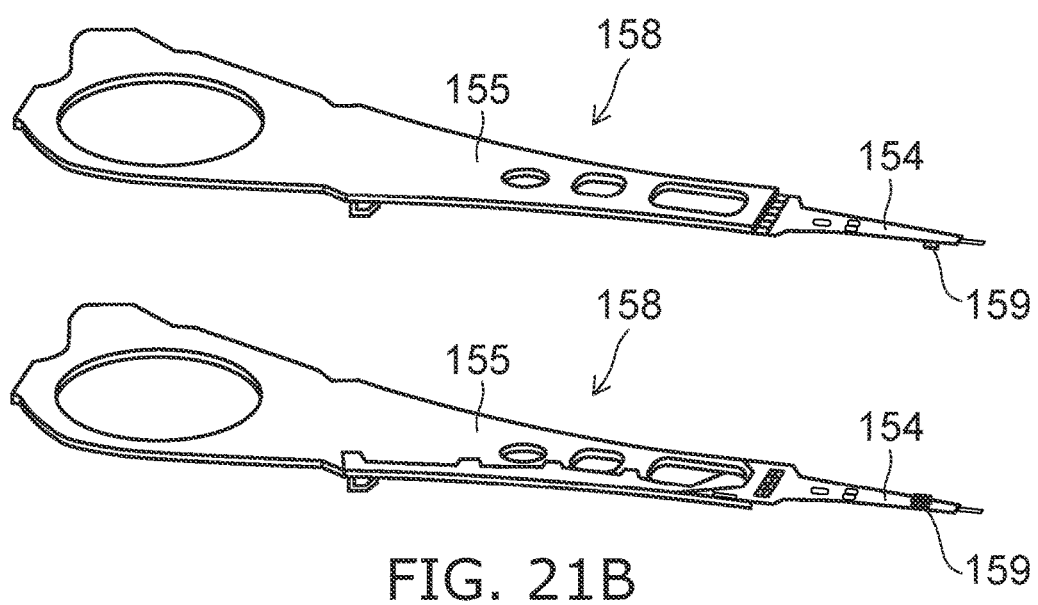

FIGS. 21A and 21B are schematic perspective views illustrating a part of the magnetic recording device according to the embodiment.

As shown in FIG. 20, in a magnetic recording device 150 according to the embodiment, a rotary actuator is used. A recording medium disk 180 is mounted on a spindle motor 180M. The recording medium disk 180 is rotated in the direction of the arrow AR by the spindle motor 180M. The spindle motor 180M responds to a control signal from the drive device controller. The magnetic recording device 150 according to the embodiment may include multiple recording medium disks 180. The magnetic recording device 150 may include a recording medium 181. The recording medium 181 is, for example, an SSD (Solid State Drive). As the recording medium 181, for example, a non-volatile memory such as a flash memory is used. For example, the magnetic recording device 150 may be a hybrid HDD (Hard Disk Drive).

The head slider 159 records and reproduces the information to be recorded on the recording medium disk 180. The head slider 159 is provided at the tip of a thin film suspension 154. The magnetic head according to the embodiment is provided near the tip of the head slider 159.

When the recording medium disk 180 rotates, the pressing pressure by the suspension 154 and the pressure generated on the medium-facing surface (ABS) of the head slider 159 are balanced. The distance between the medium-facing surface of the head slider 159 and the surface of the recording medium disk 180 is a predetermined levitation amount. In the embodiment, the head slider 159 may come into contact with the recording medium disk 180. For example, a contact sliding type may be applied.

The suspension 154 is connected to one end of an arm 155 (e.g., an actuator arm). The arm 155 has, for example, a bobbin portion and the like. The bobbin portion holds the drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin portion of the arm 155. The magnetic circuit includes a permanent magnet and an opposed yoke. The drive coil is provided between the permanent magnet and the opposed yoke. The suspension 154 has one end and the other end. The magnetic head is provided at one end of the suspension 154. The arm 155 is connected to the other end of the suspension 154.

The arm 155 is held by ball bearings. The ball bearings are provided at two locations above and below the bearing part 157. The arm 155 can be rotated and slid by the voice coil motor 156. The magnetic head can be moved to an arbitrary position on the recording medium disk 180.

FIG. 21A illustrates the partial configuration of the magnetic recording device and is an enlarged perspective view of the head stack assembly 160.

FIG. 21B is a perspective view illustrating a magnetic head assembly (head gimbal assembly: HGA) 158 that is a part of the head stack assembly 160.

As shown in FIG. 21A, the head stack assembly 160 includes the bearing portion 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 21B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154.

The suspension 154 includes, for example, lead wires (not shown) for recording and reproducing signals. The suspension 154 may include, for example, a lead wire (not shown) for a heater for adjusting the levitation amount. The suspension 154 may include a lead wire (not shown) for, for example, a spin transfer torque oscillator. These lead wires and multiple electrodes provided on the magnetic head are electrically connected.

The magnetic recording device 150 is provided with a signal processor 190. The signal processor 190 records and reproduces the signal on the magnetic recording medium using the magnetic head. In the signal processor 190, the input/output lines of the signal processor 190 are connected to, for example, the electrode pads of the head gimbal assembly 158, and electrically connected to the magnetic head.

The magnetic recording device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces the signal on the magnetic recording medium using the magnetic head.

For example, as the magnetic recording medium described above, the recording medium disk 180 is used. The movable part includes, for example, the head slider 159. The position controller includes, for example, the head gimbal assembly 158.

The embodiment may include the following configurations (e.g., technical proposals).

Configuration 1

A magnetic head, comprising:
a magnetic pole;
a shield; and
a non-magnetic layer provided between the magnetic pole and the shield, the non-magnetic layer being in contact with the magnetic pole and the shield, the non-magnetic layer including a first element including at least one selected from the group consisting of Cu, Au, Cr, V, Al and Ag.

Configuration 2

The magnetic head according to Configuration 1, wherein
a thickness of the non-magnetic layer along a direction from the magnetic pole toward the shield is not less than 2 nm and not more than 50 nm.

Configuration 3

The magnetic head according to Configuration 1 or 2, wherein
the shield is one of a trailing shield and a leading shield.

Configuration 4

The magnetic head according to Configuration 1 or 2, wherein
the shield includes a trailing shield and a leading shield,
the non-magnetic layer includes a first non-magnetic layer and a second non-magnetic layer,
the first non-magnetic layer is provided between the magnetic pole and the trailing shield, and is in contact with the magnetic pole and the trailing shield, the first non-magnetic layer includes at least one selected from the group consisting of Cu, Au, Cr, V, Al and Ag, and
the second non-magnetic layer is provided between the magnetic pole and the leading shield, and is in contact with the magnetic pole and the leading shield, the second non-magnetic layer includes at least one selected from the group consisting of Cu, Au, Cr, V, Al and Ag.

Configuration 5

The magnetic head according to Configuration 1 or 2, wherein
the shield is one of a first side shield and a second side shield.

Configuration 6

The magnetic head according to Configuration 1 or 2, wherein
the shield includes a first side shield and a second side shield,
the non-magnetic layer includes a first non-magnetic layer and a second non-magnetic layer,
the first non-magnetic layer is provided between the magnetic pole and the first side shield, and is in contact with the magnetic pole and the first side shield, the first non-magnetic layer includes at least one selected from the group consisting of Cu, Au, Cr, V, Al and Ag, and
the second non-magnetic layer is provided between the magnetic pole and the second side shield, and is in contact with the magnetic pole and the second side shield, the second non-magnetic layer includes at least one selected from the group consisting of Cu, Au, Cr, V, Al and Ag.

Configuration 7

The magnetic head according to any one of Configurations 1 to 6, wherein
the magnetic pole includes a medium-facing surface, and
the non-magnetic layer is retracted with reference to the medium-facing surface.

Configuration 8

A magnetic head, comprising:
a magnetic pole;
a first shield, the first shield being one of a trailing shield and a leading shield;
a first side shield, a direction from the magnetic pole toward the first side shield crossing a direction from the magnetic pole toward the first shield, and
a non-magnetic layer provided between the first shield and the first side shield, the non-magnetic layer being in contact with the first shield and the first side shield, the non-magnetic layer including at least one first element selected from the group consisting of Cu, Au, Cr, V, Al and Ag.

Configuration 9

The magnetic head according to Configuration 8, wherein
a thickness of the non-magnetic layer along a direction from the first shield toward the first side shield is not less than 2 nm and not more than 50 nm.

Configuration 10

The magnetic head according to Configuration 8 or 9, further comprising:
a second side shield,
at least a part of the magnetic pole being between the first side shield and the second side shield,
the non-magnetic layer including a first non-magnetic layer and a second non-magnetic layer,
the first non-magnetic layer being provided between the first shield and the first side shield, and being in contact with the first shield and the first side shield, the first non-magnetic layer including at least one selected from the group consisting of Cu, Au, Cr, V, Al and Ag, and
the second non-magnetic layer being provided between the first shield and the second side shield, and being in contact with the first shield and the second side shield, the second non-magnetic layer including at least one selected from the group consisting of Cu, Au, Cr, V, Al and Ag.

Configuration 11

The magnetic head according to Configuration 10, further comprising:
a second shield, the second shield being other one of the trailing shied and the leading shield,
the non-magnetic layer including a third non-magnetic layer and a fourth non-magnetic layer,
the third non-magnetic layer being provided between the second shield and the first side shield, and being in contact with the second shield and the first side shield, the third non-magnetic layer including at least one selected from the group consisting of Cu, Au, Cr, V, Al and Ag, and
the fourth non-magnetic layer being provided between the second shield and the second side shield, and being in contact with the second shield and the second side shield, the fourth non-magnetic layer including at least one selected from the group consisting of Cu, Au, Cr, V, Al and Ag.

Configuration 12

A magnetic head, comprising:
a magnetic pole including a first partial region and a second partial region; and
a non-magnetic layer provided between the first partial region and the second partial region, the non-magnetic layer including at least one first element selected from the group consisting of Cu, Au, Cr, V, Al and Ag.

Configuration 13

The magnetic head according to Configuration 12, wherein the magnetic pole includes a medium-facing surface, and the first partial region is between the medium-facing surface and the second partial region.

Configuration 14

A magnetic recording device, comprising:

the magnetic head according to any one of Configurations 1 to 13; and a first current circuit, the first current circuit being configured to supply a first current between the magnetic pole and the shield, and when the first current is supplied between the magnetic pole and the shield, an alternating magnetic field is generated from at least one of the magnetic pole or the shield.

Configuration 15

A magnetic head, comprising:

a magnetic pole; and a conductive member electrically connected to the magnetic pole, when an AC current being supplied to the conductive member and the magnetic pole, an alternating magnetic field being generated from the magnetic pole.

Configuration 16

The magnetic head according to Configuration 15, further comprising:

a magnetic pole terminal electrically connected to the magnetic pole; and a conductive member terminal electrically connected to the conductive member.

Configuration 17

A magnetic recording device, comprising:

the magnetic head according to Configuration 15 or 16;

an AC current circuit, the AC current circuit being configured to supply the AC current to the magnetic pole and the conductive member, and when the AC current is supplied to the magnetic pole and the conductive member, an alternating magnetic field is generated from the magnetic pole.

Configuration 18

A magnetic head, comprising:

a magnetic pole;

a shield; and a stacked body provided between the magnetic pole and the shield, the stacked body including a first magnetic layer, a first non-magnetic layer provided between the magnetic pole and the first magnetic layer, the first magnetic layer including one of a first material and a second material, the first material including at least one selected from the group consisting of Cu, Au, Cr, V, Al and Ag, the second material including at least one selected from the group consisting of Ru, Ir, Ta, Rh, Pd, Pt, and W, and a second non-magnetic layer provided between the first magnetic layer and the shield, the second magnetic layer including other one of the first material and the second material, at least one of the magnetic pole or the shield oscillating with the stacked body.

Configuration 19

A magnetic head, comprising:

a magnetic pole;

a first shield, the first shield being one of a trailing shield and a leading shield;

a first side shield, a direction from the magnetic pole toward the first side shield crossing a direction from the magnetic pole toward the first shield; and a stacked body provided between the first shield and the first side shield, the stacked body including a first magnetic layer, a first non-magnetic layer provided between the first magnetic layer and the first shield, the first non-magnetic layer including one of a first material and a second material, the first material including at least one selected from the group consisting of Cu, Au, Cr, V, Al and Ag, the second material including at least one selected from the group consisting of Ru, Ir, Ta, Rh, Pd, Pt, and W, and a second non-magnetic layer provided between the first magnetic layer and the first side shield, the second non-magnetic layer including other one of the first material and the second material, at least one of the first shield or the first side shield oscillating with the stacked body.

Configuration 20

A magnetic head, comprising:

a magnetic pole including a first partial region and a second partial region; and a stacked body provided between the first partial region and the second partial region, the stacked body including a first magnetic layer, a first non-magnetic layer provided between the first partial region and the first magnetic layer, the first non-magnetic layer including one of a first material and a second material, the first material including at least one selected from the group consisting of Cu, Au, Cr, V, Al and Ag, the second material including at least one selected from the group consisting of Ru, Ir, Ta, Rh, Pd, Pt, and W, and a second non-magnetic layer provided between the first magnetic layer and the second partial region, the second non-magnetic layer including other one of the first material and the second material, at least a part of the magnetic pole oscillating with the stacked body.

According to the embodiment, a magnetic head and a magnetic recording device can be provided, in which a recording density is possible to be improved.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, stacked bodies, magnetic layers, non-magnetic layers, conductive members, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, configured to be included in a magnetic recording device, comprising:
   a magnetic pole;
   a first shield, the first shield being one of a trailing shield and a leading shield;
   a first side shield, a direction from the magnetic pole toward the first side shield crossing a direction from the magnetic pole toward the first shield, and
   a non-magnetic layer provided between the first shield and the first side shield, the non-magnetic layer being in contact with the first shield and the first side shield, the non-magnetic layer including at least one first element selected from the group consisting of Cu, Au, Cr, V, Al and Ag,
   wherein
   a first current supplied by a first current circuit, included in the magnetic recording device, flows in the non-magnetic layer and the first side shield,
   the magnetic head further comprising:
   a second side shield,
   at least a part of the magnetic pole being between the first side shield and the second side shield,
   the non-magnetic layer including a first non-magnetic layer and a second non-magnetic layer,
   the first non-magnetic layer being provided between the first shield and the first side shield, and being in contact with the first shield and the first side shield, the first non-magnetic layer including at least one selected from the group consisting of Cu, Au, Cr, V, Al and Ag, and
   the second non-magnetic layer being provided between the first shield and the second side shield, and being in contact with the first shield and the second side shield, the second non-magnetic layer including at least one selected from the group consisting of Cu, Au, Cr, V, Al and Ag,
   a second shield, the second shield being other one of the trailing shield and the leading shield,
   the non-magnetic layer including a third non-magnetic layer and a fourth non-magnetic layer,
   the third non-magnetic layer being provided between the second shield and the first side shield, and being in contact with the second shield and the first side shield, the third non-magnetic layer including at least one selected from the group consisting of Cu, Au, Cr, V, Al and Ag, and
   the fourth non-magnetic layer being provided between the second shield and the second side shield, and being in contact with the second shield and the second side shield, the fourth non-magnetic layer including at least one selected from the group consisting of Cu, Au, Cr, V, Al and Ag.

2. The head according to claim 1, wherein
   a thickness of the non-magnetic layer along a direction from the first shield toward the first side shield is not less than 2 nm and not more than 50 nm.

3. A magnetic recording device, comprising:
   the magnetic head according to claim 1.

4. A magnetic head, comprising:
   a magnetic pole including a first partial region and a second partial region;
   a non-magnetic layer provided between the first partial region and the second partial region, the non-magnetic layer including at least one first element selected from the group consisting of Cu, Au, Cr, V, Al and Ag;
   a second shield; and
   a second non-magnetic layer provided between the first partial region and the second shield,
   a direction from the first partial region to the second partial region crosses a direction from the first partial region to the second shield,
   wherein
   the magnetic pole includes a medium-facing surface, and
   the first partial region is between the medium-facing surface and the second partial region.

5. A magnetic recording device, comprising:
   the magnetic head according to claim 4.

6. A magnetic head, comprising:
   a magnetic pole;
   a shield; and
   a non-magnetic layer provided between the magnetic pole and the shield, the non-magnetic layer being in contact with the magnetic pole and the shield, the non-magnetic layer including a first element including at least one selected from the group consisting of Cu, Au, Cr, V, Al and Ag,
   wherein
   the shield includes a trailing shield and a leading shield,
   the non-magnetic layer includes a first non-magnetic layer and a second non-magnetic layer,
   the first non-magnetic layer is provided between the magnetic pole and the trailing shield, and is in contact with the magnetic pole and the trailing shield, the first non-magnetic layer includes at least one selected from the group consisting of Cu, Au, Cr, V, Al and Ag,
   the second non-magnetic layer is provided between the magnetic pole and the leading shield, and is in contact with the magnetic pole and the leading shield, the second non-magnetic layer includes at least one selected from the group consisting of Cu, Au, Cr, V, Al and Ag,
   wherein
   the magnetic pole includes a medium-facing surface, and
   the first non-magnetic layer and the second non-magnetic layer are retracted with reference to the medium-facing surface.

7. A magnetic recording device, comprising:
   the magnetic head according to claim 6.

8. A magnetic head, comprising:
   a magnetic pole;

a first shield, the first shield being one of a trailing shield and a leading shield;

a first side shield, a direction from the magnetic pole toward the first side shield crossing a direction from the magnetic pole toward the first shield, a non-magnetic layer provided between the first shield and the first side shield, the non-magnetic layer being in contact with the first shield and the first side shield, the non-magnetic layer including at least one first element selected from the group consisting of Cu, Au, Cr, V, Al and Ag; and a second side shield, at least a part of the magnetic pole being between the first side shield and the second side shield, the non-magnetic layer including a first non-magnetic layer and a second non-magnetic layer, the first non-magnetic layer being provided between the first shield and the first side shield, and being in contact with the first shield and the first side shield, the first non-magnetic layer including at least one selected from the group consisting of Cu, Au, Cr, V, Al and Ag, and the second non-magnetic layer being provided between the first shield and the second side shield, and being in contact with the first shield and the second side shield, the second non-magnetic layer including at least one selected from the group consisting of Cu, Au, Cr, V, Al and Ag, the magnetic pole includes a medium-facing surface, and the first non-magnetic layer and the second non-magnetic layer are retracted with reference to the medium-facing surface.

9. A magnetic recording device, comprising:

the magnetic head according to claim 8.

* * * * *